United States Patent [19]

Moser

[11] Patent Number: 5,466,646

[45] Date of Patent: Nov. 14, 1995

[54] PROCESS FOR THE PREPARATION OF SOLID STATE MATERIALS AND SAID MATERIALS

[75] Inventor: William R. Moser, Hopkinton, Mass.

[73] Assignee: Worcester Polytechnic Institute, Worcester, Mass.

[21] Appl. No.: 931,766

[22] Filed: Aug. 18, 1992

[51] Int. Cl.$^6$ ................................................ B01J 29/04
[52] U.S. Cl. ............................ 502/60; 502/234; 502/235; 502/236; 502/523
[58] Field of Search ............................ 502/5, 60, 234, 502/235, 236, 523

[56] References Cited

U.S. PATENT DOCUMENTS

| | | | |
|---|---|---|---|
| 2,457,091 | 12/1948 | Schlesman | 502/5 |
| 2,487,284 | 10/1949 | Glassbrook et al. | 502/5 |
| 2,968,652 | 1/1961 | Mertes | 502/5 |
| 4,111,846 | 9/1978 | Elliott, Jr. | 502/235 |
| 4,306,962 | 12/1981 | Estes | 502/73 |
| 4,574,078 | 3/1986 | Cortesi et al. | 423/592 |
| 5,087,437 | 2/1992 | Bruno et al. | 423/598 |
| 5,133,955 | 7/1992 | Raghavan et al. | 423/592 |
| 5,238,669 | 8/1993 | Sullivan | 423/344 |
| 5,242,674 | 9/1993 | Bruno et al. | 423/593 |

FOREIGN PATENT DOCUMENTS

| | | |
|---|---|---|
| 300853 | 1/1989 | European Pat. Off. . |
| 300851 | 1/1989 | European Pat. Off. . |
| 0431404 | 6/1991 | European Pat. Off. . |
| 04494541 | 10/1991 | European Pat. Off. . |
| 0505022 | 9/1992 | European Pat. Off. . |
| 701370 | 12/1940 | Germany . |
| 103033 | 6/1985 | Japan . |
| 30605 | 2/1987 | Japan . |
| 408891 | 4/1934 | United Kingdom . |
| 828728 | 2/1960 | United Kingdom . |
| 8903365 | 4/1989 | WIPO . |

*Primary Examiner*—Asok Pal
*Attorney, Agent, or Firm*—Bruce Jacobs; Diderico Van Eyl

[57] ABSTRACT

A process for the preparation of solid state materials such as catalysts, electrolytes, piezo electric materials and superconductors is disclosed. The process produces materials with high phase purity. Novel solid state materials having high phase purity are also disclosed.

22 Claims, 15 Drawing Sheets

METAL OXIDE
SEPARATION

PROCESS FOR THE PREPARATION OF SOLID STATE MATERIALS AND SAID MATERIALS

BACKGROUND OF THE INVENTION

The catalyst industry is a multi-billion dollar industry which continues to grow. Catalysts are used in virtually all chemical processes, including those used to make industrial chemicals, oil products and pharmaceuticals. A significant amount of catalysts are solid state materials containing a metal or a metal compound such as a metal oxide. A co-precipitation process is generally employed to manufacture such catalysts. Other metal based materials such as superconductors, solid state electrolytes and piezo-electric materials are formed in a similar manner using a co-precipitation process. The co-precipitation method, however, has the disadvantages of producing materials which are not exceptionally homogeneous and the reproducibility of the process is often poor.

As a result, there is a need for a process to synthesize such materials which is both easily reproducible and which provides solid state materials such as catalysts in a high state of phase purity.

SUMMARY OF THE INVENTION

Accordingly, the present invention is directed to a process for producing solid state materials such as catalysts, piezo-electric materials, superconductors, and electrolytes, which process is easily reproducible and results in materials of exceptionally high phase purity with homogeneously dispersed metal components. The process generally comprises the steps of (1) mixing together a metal solution such as a metal salt solution and a solution containing a precipitating agent to form a mixed solution, (2) pressurizing the mixed solution, (3) passing the pressurized mixed solution into a fluidizer apparatus wherein high shear forces act on the mixed solution causing homogeneous mixing thereof, (4) depressurizing the mixed solution so as to cause cavitation, preferably along with heating, and (5) separating a high purity solid state material from the cavitated mixed solution.

The process according to the present invention preferably employs a special apparatus to carry out steps 3 and 4 in the process such as a Microfludizer, manufactured by Microfluidics Corporation of Newton, Mass. By controlling the pressure of the mixed solution before it is subjected to high shear forces in the fluidizer apparatus, the particle size of the solid state materials which are finally produced can be controlled. By increasing the pressure to preferably about 1,000 to 50,000 psig, the particle size of the solid state materials within the mixed solution are reduced, facilitating homogeneous distribution of the various components of the solid state materials. Moreover, as a result of the cavitation that occurs, thermal calcining, which is normally performed as a separate step in a co-precipitation process, can be eliminated. Calcination can most often be eliminated when the process is carried out at relatively high pressures, i.e. generally above about 25,000 psig. Calcination of the materials produced by the process may still be necessary when relatively low pressures are employed.

The process according to the present invention is particularly suitable for producing solid state materials such as single metal oxide catalysts, complex metal oxide catalysts, zeolites, metal loaded zeolites, piezo-electric materials, superconductors and solid state electrolytes. Such materials produced by the invention process possess higher phase purity than substantially the same materials produced by conventional co-precipitation processes.

DETAILED DESCRIPTION OF THE PREFERRED EMBODIMENTS

Figure 1:
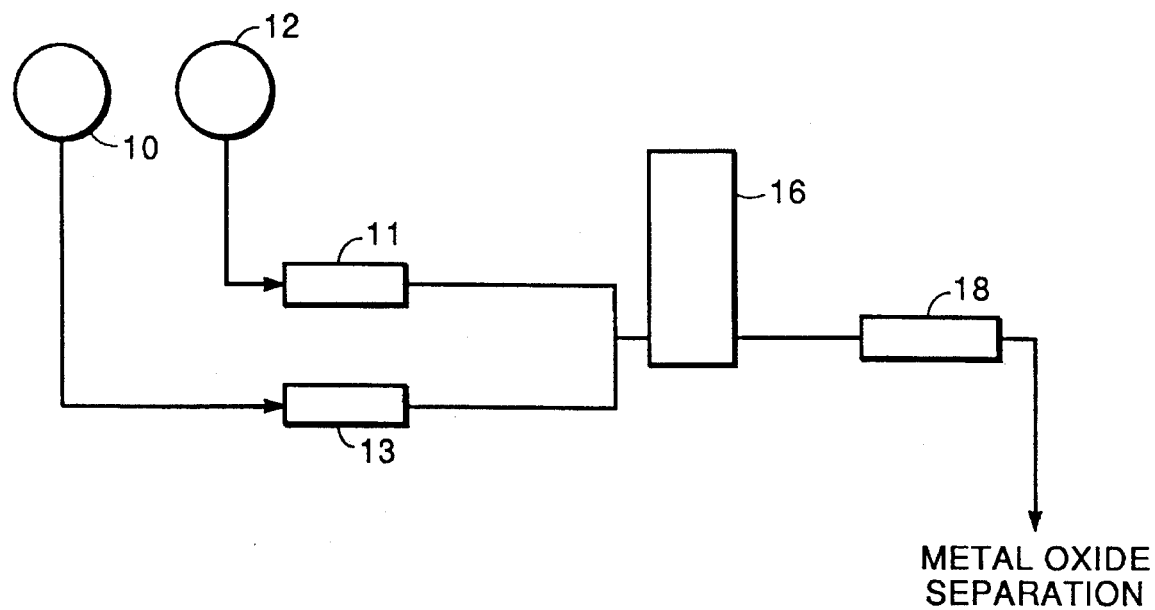
FIG. 1 is a process scheme for an embodiment of the present invention.

Referring to the drawings, one embodiment according to the present invention, a continuous process, is shown in FIG. 1. As shown, a metal-containing solution such as a metal salt solution within reservoir 10 and a solution containing a precipitating agent within reservoir 12 are passed through metering pumps 11 and 12, respectively, and then together forming a mixed solution just prior to entry into a high pressure pump 16. The metering pumps control the flow of material to the high pressure pump 16. The precipitating agent solution must be maintained at a suitable pH to facilitate the precipitation of the metal ions in solution. Depending upon the metal solution and the precipitating agent, the pH generally is of from about 7.5 to 12. While pump 16 is shown outside fluidizing apparatus 18, it may be disposed within the apparatus. The mixed solution passes through the high pressure pump 16 and is elevated by the action of the pump to a pressure of from about 1,000 to 50,000 psig or more and more preferably to a pressure of from about 25,000 to 50,000 psig. The pressure employed will depend upon the end product desired. Generally, as the pressure is increased, the particle size of the metal components is decreased.

The mixed solution at a high pressure is then channeled into fluidizing apparatus 18. Within apparatus 18 the mixed solution is vigorously mixed. This preferably takes place within the apparatus by dividing the mixed solution into two streams and then recombining the two streams by redirecting them so that they collide with each other. Preferably the streams collide head on, but other angles of collision produce suitable results. At the point of the collision, the mixed solution undergoes vigorous mixing while simultaneously returning to atmospheric pressure. As the pressure drops rapidly from above about 1,000 psig to atmospheric pressure, bubbles form within the mixed solution and thereafter rapidly collapse releasing energy. The energy released when the bubbles collapse, known as cavitation, is transferred to the precipitated metal material suspended within the liquid. This rapid heat-up followed by a rapid local cooling as the energy is released can result in an effective high temperature calcining of the solid metal materials formed while they are in a high state of dispersion. The desired solid metal materials are then removed from solution by suitable separation techniques. Such techniques include vacuum filtration, filtration and evaporation. Filtration is generally only suitable if the particle sizes of the materials so formed are greater than nanometer size. When the particles are nanometers in size, evaporation of the water or solution liquid leaving the highly dispersed solid metal materials is the preferred method of separation. The materials are then dried by suitable means. In most cases, the solid metal materials such as metal oxide catalysts are ready for use, without the need for calcining as a result of the cavitation that occurs in apparatus 18.

While any apparatus which achieves substantially the same degree of mixing and cavitation intensity may be used to achieve the vigorous mixing and cavitation, a particularly preferred device is the device which is disclosed in U.S. Pat. No. 4,533,254, the subject matter of which is incorporated herein by reference. The most preferred apparatus is the Microfluidizer, manufactured by Microfluidics Corp. of Newton, Mass.

Figure 2:
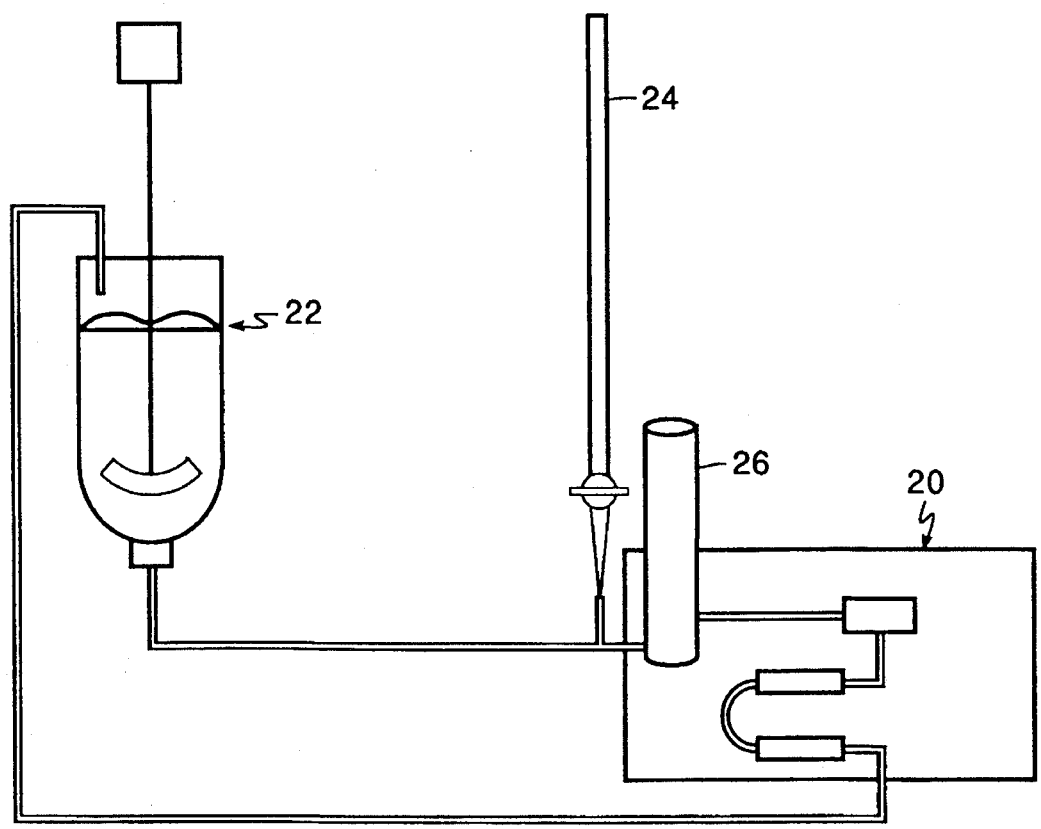
FIG. 2 is a process scheme of another embodiment of the present invention.

Another embodiment according to the present invention is shown in FIG. 2. In this embodiment, a recirculation line is added to recirculate the mixed solution which has been treated in fluidizer apparatus 20. As shown, a metal salt solution disposed in reservoir 22 (Port A) is circulated and mixed with a solution containing a precipitating agent stored in reservoir 24. The two solutions are initially mixed at Port B just prior to entering a high pressure pump 26 disposed in fluidizer 20. The fluidizer apparatus 20 operates in the same manner as fluidizer apparatus 18 in FIG. 1. After undergoing vigorous mixing and cavitation in the fluidizer 20, the mixed solution is recirculated through reservoir 22. The mixed solution continues to circulate undergoing treatment within the fluidizer while the precipitating agent is gradually added, generally over a period of about 30 to 40 minutes. This time can vary over this range and even outside of the range depending upon the amount of materials being mixed. The recirculation generally continues for about 10 to 40, more preferably from about 20 to 40, minutes after the complete addition of precipitating agent. The period of recirculation will depend upon the final product which is desired and can vary outside of the general range recited herein. As the length of the period of recirculation increases, the resulting final product generally has a higher degree of phase purity and smaller particle size.

In another embodiment (not shown), the reservoir 22 of Fig. 2 contains precipitating agent solution and the reservoir 24 contains the metal salt solution for addition to the recirculating line. This embodiment operates in the same manner as the FIG. 2 embodiment except for the reversal of the two reservoirs. This embodiment is presently most preferred because precipitated solid state material is recirculated so that particle sizes are further reduced during recirculation, and further in situ high temperature calcining is realized.

In still another embodiment, the metal salt solution and the precipitating agent solution may be premixed in a single reservoir and then passed through a pressurizing pump and then into the fluidizing apparatus. This embodiment may be employed either with or without recirculation. This process scheme is particularly useful in making zeolite catalysts wherein the premixed solution is a zeolite gel containing a precipitating agent.

More particularly the zeolite gel comprises a silica source, a metal material and a precipitating agent and optionally colloidal silica, a transition metal such as Pt, Ir, Pd, Zn and Ni, and NaOH. This gel is then pressurized, passed through the fluidizer apparatus undergoing mixing and cavitation. Thereafter, the entire mixture is transferred to a high pressure autoclave and undergoes hydrothermal synthesis. The autoclave is heated for about 4 to 170 hours to temperatures ranging from about 60° to 190° C., under pressures ranging from about 14 to 800 psia and then cooled. After cooling, the crystalline product is removed by suitable filtration, dried and calcined by conventional means.

Alternatively, the zeolite may be prepared by first mixing the materials that make up the zeolite gel in a high pressure autoclave and then recycling the autoclave mixed material through a high pressure pump and fluidizer apparatus. This procedure is used for zeolite synthesis where gelation does not occur immediately upon mixing all of the reactants but does occur during the heat up cycle. Treatment by the process by recirculation during the synthesis results in well crystallized, homogeneous zeolites. The recycling may take place for a period of about 0.5 to 6 hrs. One or more such recycling stages may be carried out over a period of about 0.5 to 48 hrs to achieve a final crystallized zeolite product.

In certain situations, particularly when employing the process to make mixed metal oxide catalysts, it is sometimes necessary to use separate reservoirs to store the different metal salt solutions. This is because particular metal salts may require particular solvents which if mixed together would cause premature precipitation resulting in separate phase products. Accordingly, different reservoirs with different solvents may be required to dissolve different metal salts. In such a situation, the separate metal salt solutions are combined with the precipitating agent solution just prior to the pressurizing pump.

To synthesize the solid state materials described herein, specific stoichiometry is required for each preparation. Generally, the metal solution stoichiometry is substantially the same as the desired solid state metal stoichiometry.

In the embodiments where the precipitating agent is recirculated it is desirable that the pH of the mixed solution be maintained on the basic side; i.e.; between about 7.5–12 and more preferably between about 8.5 to 12. However, the range is dependent on the precise solid state metal synthesized. In some cases, additional precipitating agent must be added to the recirculating mixed solution to keep the pH in a high range of about 8–12.

When the metal solution is recirculated and the precipitating agent added just before the pump, a total amount of precipitating agent is added so that the pH of the recirculating solution rises slowly until about the 8–12 range.

The process of the present invention is particularly useful in making solid state metal based materials such as catalysts. In making such products, the metal which makes up the products is added in the form of one or more metal solutions. Most metals are in the form of salts. However, in the case of certain precious metals the metal may be added in the form of an acid such as chloroplatinic acid. Examples of suitable salts include nitrates, sulfates, acetates, chlorides, bromides, hydroxides, oxalates, and acetylacetonates. The particular metals will, of course, depend on the particular product which is being made. For example, if the desired catalyst is $Fe_{2-x}Cr_x(MoO_4)_3$ a suitable metal salt solution may comprises $Fe(NO_3)_3 \cdot H_2O$ $(NH_4)_6 Mo_7O_{24} \cdot 4H_2O$ and $Cr(NO_3)_3 \cdot H_2O$. In the case of bismuth molybdate catalysts, the metal salt solutions may be $Bi(NO_3)_3 \cdot 5H_2O$ and $(NH_4)_6MoO_{24} \cdot 4H_2O$. A catalyst such as $La_{(1-x)}Sr_xFe_2O_{33}$ can be produced from a mixture of strontium nitrate, lanthanum nitrate and iron nitrate. An electrolyte or ceramic material such as $(x)Y_2O_3(1-x) ZrO_2$ (x= about 0.001 to 0.12) can use metal salts such as yttrium nitrate-hydrate and zirconyl nitrate hydrate. A piezo-electric such as lead zirconium titanate (PZT) can be made using titanium tetrabutoxide, zirconyl nitrate hydrate and lead acetate.

The liquids into which the metal salts are dissolved will depend upon the particular metal salt. Suitable such liquids include water, aqueous nitric acid, alcohols, acetone, hydrocarbons, chlorinated hydrocarbons, and the like.

In the case of preparing catalysts, a support may be added directly to the metal salt solution or precipitating agent solution or to both. Suitable supports include alumina, silica, titania, zirconia and alumino-silicates. The support may also be added in the form of a salt. For example, alumina may be added as aluminum nitrate hydrate.

The process of the present invention is particularly suitable for preparing metal loaded zeolite catalysts containing one or more metals such as platinum, palladium, zinc, gallium and iron. In the preparation of a zeolite, a silica source such as a low Al-containing colloidal silica, fumed silica, silica gel or tetraethylorthosilicate is mixed with a precipitating agent such as tetrapropylammonium hydroxide, sodium hydroxide, ammonium hydroxide, potassium hydroxide or tetramethyl ammonium hydroxide, a source of metal, and optionally a catalytic metal in the form of such as chloroplatinic acid, palladium nitrate, zinc nitrate, gallium nitrate, and rhodium trichlorides hydrate. As described previously, these components may be mixed together initially and formed into a gel or the separate colloidal silica solution and precipitating agent may be mixed separately and thereafter added to a recirculating solution of a metal solution optionally containing a precipitating agent.

The precipitating agent may be selected from any suitable basic material such as sodium carbonate, ammonium carbonate, potassium carbonate, ammonium hydroxide, substituted ammonium hydroxide, alkali metal hydroxides, and other basic materials which are dissolved in water.

The products produced by the process of the invention have components which are highly dispersed throughout the composition resulting in superior phase purity as compared to the same product produced by the prior art processes. In the case of those materials containing one or more metals, superior phase purity is achieved so that the x-ray defraction (XRD) analysis of such solid state materials shows less than about 1.0%, preferably less than about 0.5%, and most preferably less than about 0.3% of the metals in discrete separate phase compounds.

For example, one catalyst that can be synthesized by the invention process is $Fe_{2-x}Cr_{x(MoO4)_3}$, wherein x=0.2, 0.5 or 1.00. This catalyst when produced by the process of the present invention contains less separate phase $Cr_2Mo_3O_{12}$ material than a similar catalyst produced by a conventional process. The catalyst of the present invention is characterized as having a higher phase purity than a parallel, conventional preparation as evident by the appearance of a secondary phase appearing in the XRD at 12.9 two theta, which is 1.72 times larger in the classical preparation than the same impurity in the catalyst of the present invention.

Another example of a catalyst which benefits from the process of the present invention is $Bi_2Mo_2O_9$, a catalyst used for the conversion of propylene to acrolein. This catalyst, when prepared by the invention process, possesses higher phase purity than a similar catalyst prepared by a conventional process. The catalyst is characterized as one having all of the XRD peaks for $Bi_2Mo_2O_9$ and no undesired separate phase peaks in the XRD at 29.2 and 33.8 degree two theta, which appear as impurity peaks in the preparation of the material by classical co-precipitation.

A multicomponent catalyst of the formula $Ni_{10}Co_{17}Fe_{10}B_{13.3}P_{2.7-}K_3Mo_4O_x$ deposited on a silica support when produced by the process of this invention exhibits higher phase purity compared to a similarly configured catalyst produced by conventional processes. The higher phase purity is characterized in that the XRD for the catalyst has 7 distinct peaks between 23.3 and 33.7 degrees two-theta, with the peak at 23.3 greater than about 14 counts and the peak at 26.5 greater than about 40 counts, whereas a parallel preparation using conventional co-precipitation results in more than 14 peaks in the XRD which indicates the presence of several separate phases.

Another catalyst according to the present invention which can be produced with higher phase purity than a similar catalyst produced by conventional technology is a mixed copper oxide-zinc oxide catalyst on a support such as alumina. The XRD of the copper, zinc, aluminum oxide catalyst prepared by the process of the present invention exhibits bands at 31.7, 34.5, and 36.3 typical of ZnO (WURTZITE form) and a small reflection at 35.5 for separate phase CuO having a height of 3.6 % of the most intense zinc oxide peak at 3.6 degrees two-theta. Materials prepared by conventional co-precipitation methods demonstrate strong reflections for separate phase CuO, which are 5.9 times greater than the intensity of the reflection measured on the material prepared according to the present invention.

A very popular catalyst useful for the complete oxidation of carbon monoxide to carbon dioxide is an inorganic perovskite having the formula $La_{(1-x)}Sr_xFe_2O_{33}$, wherein x=0, 0.3, 0.6, 0.8 or 1.0. Such a catalyst when produced by the process of the present invention is characterized by XRD as having high phase purity with intense reflections at 32.2, 46.2, and 57.5 having relative intensities of 100/29/40, respectively, and substantially no two theta peaks at 20.2. Material formed by a classical syntheses leads to a separate, non-perovskite phase appearing at 20.2 degree two theta which has and intensity which is 38% of the main perovskite reflection at 32.2 while the perovskite prepared by the present invention shows no reflection at 20.2 degree two theta.

$Bi_{(2-2x)}Fe_{2x}Mo_3O_{12}$, where x is 0, 0.01, 0.02, 0.05 or 0.17 is a useful catalyst for the partial oxidation of hydrocarbons. It possesses equivalent phase purity and all bands expected for $Bi_2 Mo_3O_{12}$ when prepared according to the invention process. The advantage of these materials compared to the conventionally prepared materials is a slightly higher crystallinity as evidenced by broadened (about 30%) XRD reflections.

Like catalysts, solid state electrolytes produced by the process of the present invention possess higher phase purity than corresponding electrolytes produced by conventional processes. For example, $xY_2O_3 (1-x)ZrO_2$ when produced by the process of this invention showed much sharper and much more intense reflections at 30.5 degree two theta (width of peak at ½ maximum is 0.4 two theta compared to 0.9 two theta and the intensity of this peak was 36.7 times greater than this peak observed when the material is prepared conventionally). Superior phase purity is achievable by running the process at about 17,500 psig or greater. Electrolytes produced at this pressure exhibit phase purity characterized in having a moderately strong XRD peak at 75.4 degree two-theta of greater than about 11 counts and substantially no reflection at 74.75 two theta. The fact that there is no reflection at 74.75 indicates no cubic phase, but rather a textured form of tetragonal zirconia.

Piezo-electric materials also benefit from the process of the present invention. High phase purity materials are obtainable using the process of the present invention compared to piezo-electric materials produced by conventional processes. One such piezo-electric material is lead zirconium titanate (PZT). The PZT material of the present invention is characterized as having substantially no reflections due to impurities between 24 degree two-theta and 29 degree two-theta. Other piezo-electric materials such as lanthanum zirconium lead titanate, zinc oxide and having similar high phase purity may be produced by the process of the present invention.

Superconductors such as $Y_{1-0}Ba_{2.0}Cu_{3.0}O_{(7-x)}$ and $Bi_{1.6}Pb_{0.4}Sr_{2.0}Cu_{2.0}Cu_{3.0}O_9$ $Tl_2Ca_2Ba_2Cu_3O_{10+x}$ may also be prepared with higher phase purities when prepared by the current invention process than conventionally prepared materials. For example, $Y_{1.0}Ba_{2.0}Cu_{3.0}O_{(7-x)}$ wherein x is 0.26 when prepared by the current process exhibit superior phase purity. This superconductor is characterized as having substantially no peaks at 30 degree two theta and a peak at about 59 degrees two theta with an intensity of greater than 0.6 counts.

Zeolites such as ZSM-5, X-Type, Y-Type and L-Type likewise benefit from the process of the present invention. The synthesis of metal loaded zeolitic catalysts, where the metal component such as, e.g., platinum, palladium, zinc, gallium or iron, must result in a high degree of dispersion; otherwise, the bifunctional effect of the metallic sites and acid sites are not realized unless the two sites are geometrically in near proximity. Processing in a device such as the Microfluidizer provides the high degree of mixing of all components during the critical synthesis stage so that the finished zeolite has well dispersed metal within its structure where the acid sites are located. Classical methods of synthesis require an ion exchange to incorporate the metallic components. The disadvantage of this method is that the total amount of metal possible to load within the framework structure is limited by the amount of aluminum within the zeolite. This is usually low for modern cracking or reforming catalysts where the aluminum content is intentionally kept low to provide the required thermal stability for industrial operation. For example, platinum H-ZSM-5 zeolites produced according to the present invention possess a higher degree of crystallinity than conventionally prepared platinum H-ZSM-5 zeolites. Such zeolites of the present invention are characterized as having no XRD bands for any metal such as platinum and palladium which indicates a homogeneously dispersed metal within the zeolite. Zeolites of the present invention include shaped crystals, coffin shapes, cubes, and the like; for example, about 10×2 microns.

In general all of the materials prepared by the present invention resulted in sharper peaks indicating more well formed crystalline products.

The following Examples more specifically describe the preferred catalysts, electrolytes, piezo-electrics, super-conductors and zeolites of the present invention. These Examples discuss the XRD patterns with reference to the Figures showing the patterns. They also compare conventionally prepared materials with those prepared according to the process of the present invention. In the examples, all parts and percents are by weight unless otherwise specified.

EXAMPLE 1—Catalyst

This example illustrates the capabilities of the process of the present invention to accomplish the synthesis of a complex metal oxide of the same composition previously shown to be active for the commercial conversion of methanol to formaldehyde (C. J. Michaels, U. Chowdhry, W. T. A. Harrison, and A. W. Sleight, "Molybdate and Tungstate Catalysts for Methanol Oxidation", in "Solid State Chemistry in Catalysis" Ed R. K. Grasselli and J. F. Brazdil, ACS Symposium Series, 79, p 103–119(1985)). The solid state material of the chromium substitutional series, $Fe_{2-x}Cr_x(MoO_4)_3$, was synthesized by process of the present invention and by classical methods of co-precipitation to illustrate that the present invention affords a much wider range of homogeneous chromium substitution into the host $Fe_2(MoO_4)_3$ metal oxide than that obtained by classical means. This higher degree of chromium substitution is expected to provide higher activities and selectivities in the methanol conversion process.

Two series of experiments were carried out comparing the process of the present invention with the classical co-precipitation process. Both series used identical starting materials in the same concentrations. In both series the composition $Fe_{2-x}Cr_x(MoO_4)_3$ was synthesized where x=0.20, 0.50 and 1.0. A typical cavitational process synthesis for the 0.20 material used 7.27 g of $Fe(NO_3)_3.H_2O$ and 0.80 g of $Cr(NO_3)_3.H_2O$ dissolved in 50 mL of distilled water. This solution was pumped into a Microfluidizer Model M-110 through Port A as shown in FIG. 2 and continuously recirculated. A second solution containing 5.30 g of $(NH_4)_6Mo_7O_{24}.4H_2O$ dissolved in 50 mL of distilled water was slowly added over 15 minutes through a separate line at Port B which entered the Microfluidizer at the inlet of the pump. After the addition was completed, the precipitated mixture was allowed to recirculate through the machine for 30 minutes. In these experiments the Microfluidizer pump raised the internal pressure of the solution to 9,000 psi before passing through the fluidizer apparatus section of the machine. The solids resulting from this treatment were removed by vacuum filtration and dried in air at 77° C. The dried sample weighed 8.85 g. Similar preparations were carried out to obtain the substituted compound above where x=0.50 and 1.0.

The series of classically prepared $Fe_{2-x}Cr_x(MoO_4)_3$ compounds where x=0,020 were synthesized using 7.27 g of $Fe(NO_3)_3.H_2O$ and 0.80 g of $Cr(NO_3)_3H_2O$ dissolved in 50 mL of distilled water and placed in a reaction vessel at room temperature where it was well stirred. A second solution containing 5.30 g of $(NH_4)_6Mo_7O_{24}.4H_2O$ dissolved in 50 mL of distilled water was slowly added dropwise over 15 minutes. During this time a precipitate formed. After stirring an additional 15 minutes, the solid product was removed by filtration and dried at 77° C. The dried sample weighed 4.92 g. Additional classically prepared samples were synthesized where x=0.50 and 1.00 for purposes of comparison to the materials of the invention as described above.

Figure 3:
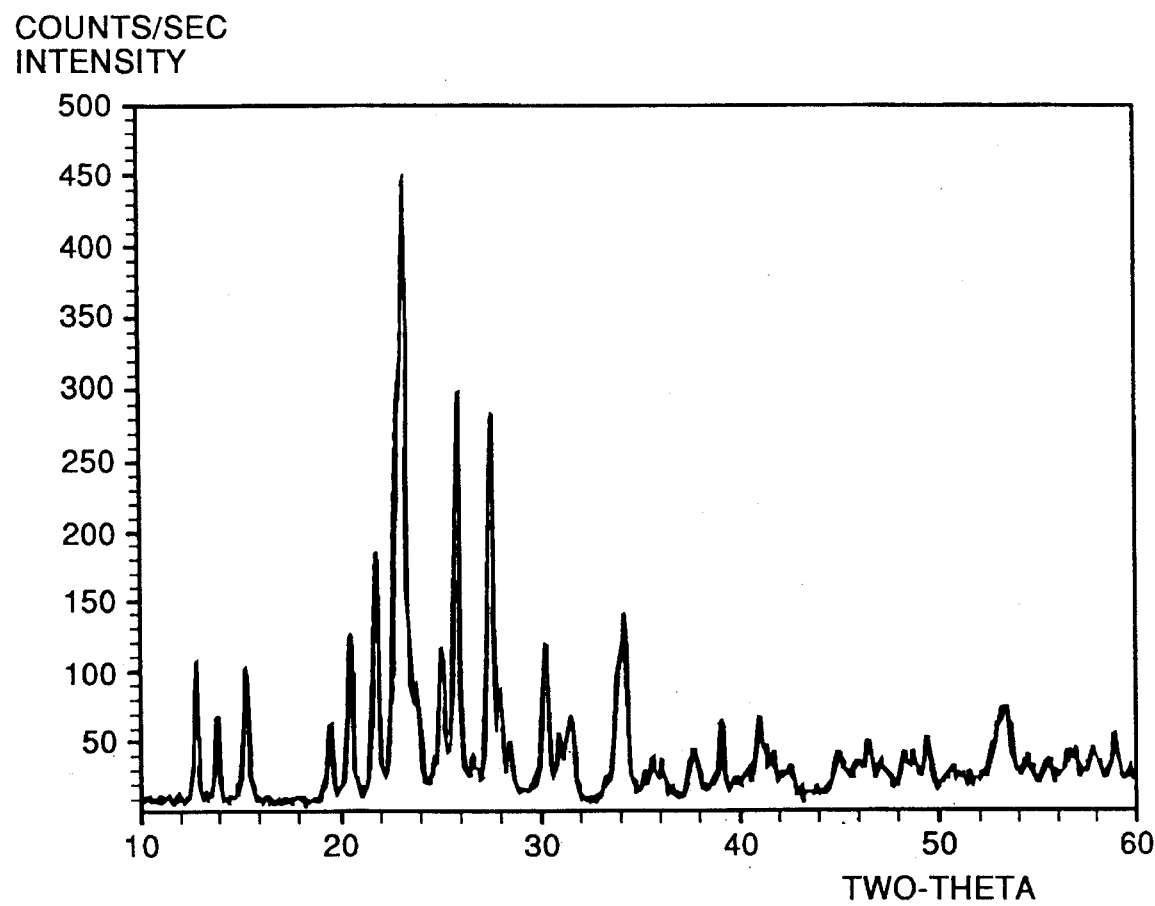
FIG. 3–16 are x-ray defraction patterns of materials of the present invention and prior art materials which are compared to the invention materials.
Figure 4:
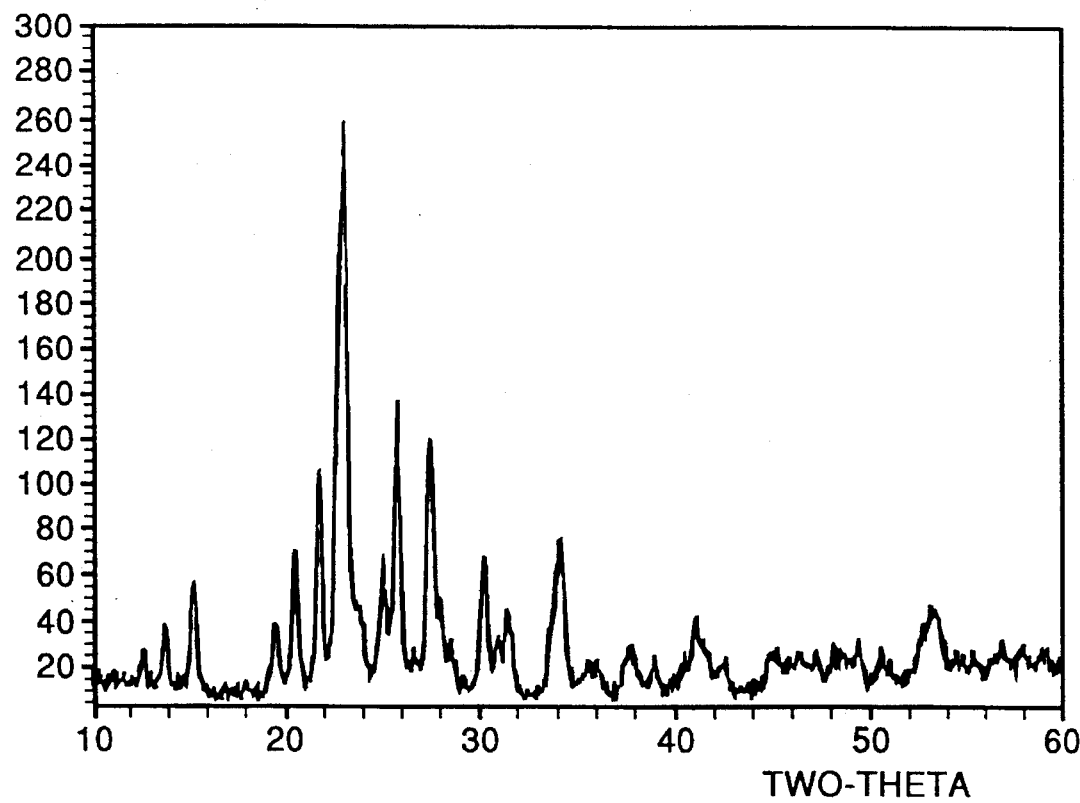

All of the solid state materials obtained from both the classical preparations and the invention process were calcined in air at 400° C. for 24 hours during which time they were converted to their oxides. These samples were analyzed by XRD using a Nicolet diffractometer (12/V-2000) using copper K-alpha irradiation. In the other Examples herein the same XRD device was used. All of the XRD analyzed samples demonstrated reflections typical of the $Fe_{2-x}Cr_x(MoO_4)_3$ family of compounds. However, in all cases the materials prepared by the process of this invention demonstrated fewer separate metal oxide phases and a higher degree of chromium ion solid solution substitution. In the preparation of advanced catalysts such as these it is desirable to increase the range of chromium substitution as far across the substitutional series as possible without resulting in the formation of separate phase metal oxides which are distinctly different from the desired $Fe_{2-x}Cr_x(MoO_4)_3$ family. The desired substitutional family is $Fe_2Mo_3O_{12}$. Chromium substitutes for iron in this material to form the solid solution compound $Fe_{2-x}Cr_x(MoO_4)_3$ which is the catalytically active and selective phase. Thus, the desired effect in synthesis is to obtain only those materials which exhibit XRD reflections for the host $Fe_2Mo_3O_{12}$ which would show patterns identical to $Fe_{2-x}Cr_x(MoO_4)_3$ except that each reflection would be slightly shifted. The shifted. The appearance of other XRD reflections indicates that undesired metal oxides were formed. The literature reported XRD for $Fe_2Mo_3O_{12}$ (JCPDS File No. 33-661) demonstrated strong reflections as follows: two theta, intensity of 13.8, 19; 15.1, 20; 22.5, 60, 22.9, 100; 25.5, 60; and 27.2, 50. The literature reported XRD analysis of the undesired second phase, $Cr_3Mo_3O_{12}$, exhibits a very similar diffraction pattern as the iron molybdate except for the intensities of three major bands. In this compound the ratio of the reflexion at 25.5 two theta to the strongest 22.9 band is 0.80. In $Fe_2$—$Mo_3O_{12}$ the ratio of these two bands is 0.60. Since the diffraction patterns of both compounds are so similar with respect to their reflection positions, one must do the phase analysis based on the difference in the ratios of the bands at 25.5/22.9. In comparing the XRD of the synthesis of the present invention to the classical synthesis reported above, the comparison of all of the samples when x=0.20, 0.50, and 1.00 clearly demonstrated that the process of the present invention resulted in less separate phase material. In the classical case the peak ratio varied from 0.53 to 0.66, indicating that a large amount of separate phase $Cr_3Mo_3O_{12}$ had formed as the Cr substitution increased. The same ratio in the case of the materials prepared by the process of the present invention varied in the range of 0.47 to 0.53, indicating that these materials contained a higher phase purity for chromium substitution into the desired material $Fe_{2-x}Cr_x(MoO_4)_3$. In addition to this analysis, the classically prepared compounds showed small separate phase peaks in the XRD at 21.9 for $Cr_3Mo_3O_{12}$. In addition the material where x=1.00 demonstrated a large unknown separate phase peak at 12.9 degree 2 theta, while the cavitational material at the same degree of substitution showed a much smaller separate phase. The XRD patterns for the classical and present invention materials are illustrated in FIGS. 3 and 4 respectively for the x=1.00 chromium substitution.

EXAMPLE 2—Catalyst

This example demonstrates the capabilities of the process of the present invention in the synthesis of bismuth molybdate catalysts which have been shown to be effective for the conversion of propylene to acrolein (J. D. Idol Jr., U.S. Pat. No. 2,904,580 (1959)). This Example illustrates in the synthesis of $Bi_2Mo_3O_{12}$, $Bi_2Mo_2O_9$ and $Bi_2MoO_6$, alpha-, beta-, and gamma-bismuth molybdate respectively by both the classical method of co-precipitation and the process of the present invention. The process of the present invention used the equipment configuration shown in FIG. 2. To prepare alpha-bismuth molybdate $Bi_2Mo_3O_{12}$, 9.7 g $Bi(NO_3)_3.5H_2O$ was dissolved in 50 mL of a 10% nitric acid solution and introduced to the Microfluidizer through Port A shown in FIG. 2. This solution was then pumped through the fluidizer while 5.295 g of $(NH_4)_6MoO_{24}.4H_2O$ was added slowly over 30 minutes through Port B. The internal pressure reached 9,000 psi during the synthesis. After the addition was completed the pH of the recirculating solution was adjusted to 4.0 by the addition of 5% ammonium hydroxide and the solution was recirculated for an additional 30 min. The solid product was removed from the solution by vacuum filtration and dried at 78° C. for 19 hours. The material weighed 8.81 g after drying. Beta- and gamma-bismuth molybdates were prepared by the cavitational process using an identical procedure except that the amounts of soluble salts used as reactants were in accord with the required stoichiometry. All of the samples were calcined in air over a 12 hour period at 250° C.

A parallel set of experiments resulted in the synthesis of alpha- beta- and gamma-bismuth molybdates by the classical co-precipitation procedure (G. W. Keulks, J. L. Hall, C. Daniel, and K. Suzuki, J. Catalysis, 34, 79(1974). This series of compounds were compared to the products of the present invention.

Figure 5:
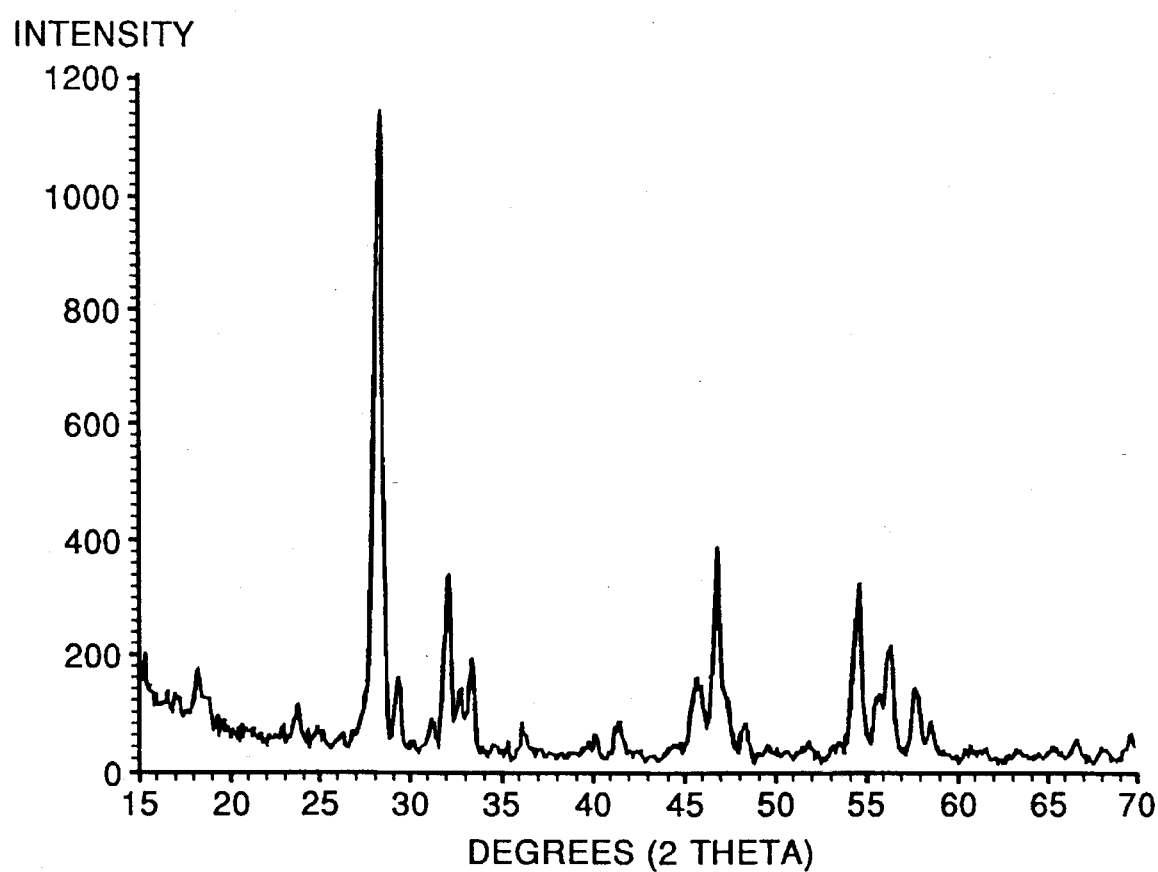
Figure 6:
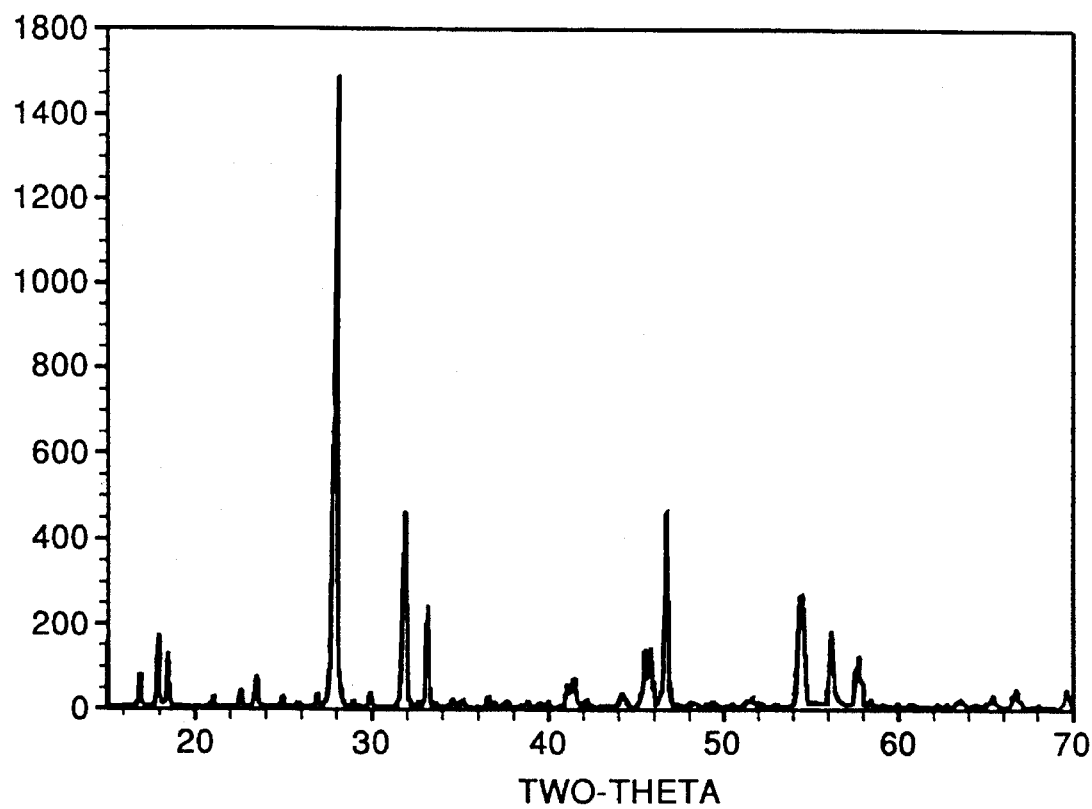

The phase purities of both the classical and present invention series were compared by XRD analyses. Alpha-, beta-, and gamma- could be prepared by both the classical and present for each material based on literature standards ($Bi_2Mo_3O_{12}$, JCPDS No. 23-1033, $Bi_2Mo_2O_9$ JCPDS No. 33-209 and $Bi_2MoO_6$, JCPDS No. 22-102, Koechlinite phase). A phase analysis of the XRD patterns for all of the synthesized materials indicated the process of the present invention offered no apparent advantage in the synthesis of alpha- and gamma- bismuth molybdates; high purities were obtained in both cases. However, the beta-material, which was shown to be the most active and selective catalyst for oxidizing propylene to acrolein (J. D. Burrington, and R. K. Grasselli, J. Catalysis, 59, 79 (1979)) demonstrated a clear improvement in phase purity when synthesized by the cavitational process. The material prepared by the invention process demonstrated only the major literature reported reflections for $Bi_2Mo_2O_9$ at 16.9, 18.0, 18.5, 27.9, 31.9, 33.2, and 46.7 degree two theta. The classically prepared $Bi_2Mo_2O_9$ demonstrated these same reflections; however, unidentified phases appeared at 29.2, and 33.8. The XRD pattern for the classically prepared material is shown in FIG. 5 and the material of the present invention is shown in FIG. 6.

EXAMPLE 3—Catalyst

This example illustrates the capabilities of the cavitational process to fabricate an industrially important catalyst where the active catalytic components are supported on an inexpensive inert support. The multicomponent catalyst is the preferred catalyst currently used industrially for the catalytic oxidation of propylene to acrolein (Grasselli et al, U.S. Pat. Nos. 3,414,631 and 3,642,930). This catalyst is formed by precipitating several metal oxides on the surface of silica gel and is called a multi-functional catalyst since all of the metals have a specific role in controlling reactivity and selectivity. Since the catalyst is multifunctional, the most effective catalysts are those which have an even dispersion of all of the active components over the surface of silica and the least effective have the active metal oxides existing as separate phase components in the catalyst.

The most effective catalyst has $Ni_{10}Co_{17}Fe_{10}B_{13.3}P_{2.7}K_3Mo_{40}O_x$ deposited in 50 wt % on a silica support and a typical preparation was published by T. Prasada and P. Menon, "Physicochemical Studies in Silica-Supported Multi-component Molybdate Catalysts before and after Use in Ammoxidation of Propylene", Journal of Catalysis, 51, 64-71(1978). This preparation was used to prepare the classical catalyst as accomplished commercially. The same components were used in the process of the present invention.

Figure 7A:
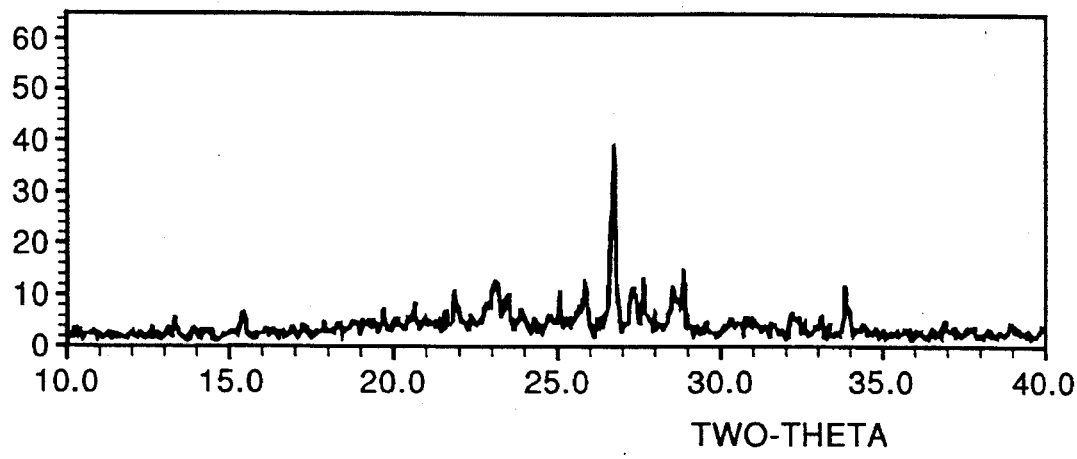
Figure 7B:
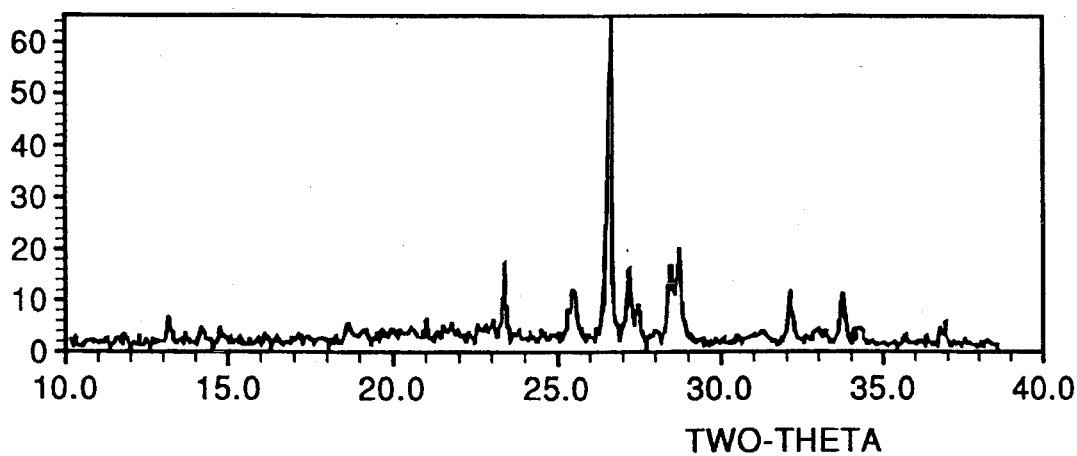

A molybdate solution was prepared from 9.21 g of $(NH_4)_6Mo_7O_{24}4H_2O$ dissolved in 50 mL of deionized water and 33 mL of concentrated ammonium hydroxide. This solution was stirred until all components were soluble. Then 12.5 g of 7G type silica gel was added to the molybdate solution and stirred to ensure homogeneity. This mixture was placed in the Microfluidizer reservoir and recirculation through the machine was started while the internal pressure was adjusted to 9,000 psi. Through Port B shown in FIG. 2 was added over 30 minutes a solution composed of 3.79 g $Ni(NO_3)_2 \cdot 6H_2O$, 6.32 g $Co(NO_3)_2 \cdot 6H_2O$, 5.27 g $Fe(NO_3)_2 \cdot b\ 9H_2O$, 2.11 g $Bi(NO_3)_3 \cdot 5H_2O$, 0.43 g $H_3PO_4(80\%)$, and 0.04g $KNO_3$ which had been built to a total volume of 50 mL with distilled water. The pH of the solution dropped until the final addition of the solution through Port A reached a final pH of 5. The temperature of the effluent which was recirculated through the instrument was maintained between 40°–46° C. by passing the effluent pipe through an ice water heat exchanger. The product mixture was filtered using Whatman type 1001070 filter paper affording 35.94 g. of solid product. The solid was calcined by slowly heating from 100° to 540° C. over 6 hours and held at 540° C. for 1 hour. The calcining procedure resulted in a 32% weight loss due to the decomposition of nitrate salts and the product was light brown. The X-Ray diffraction pattern of this material is illustrated in FIG. 7B. This material demonstrated 9 major reflections between 20 to 35 degree two theta at 23.3, 25.5, 26.7, 27.2, 27.5, 28.4, 28.7, 32.0, and 33.7. It was noted that reflections between 20 to 35 degree two theta at 23.3, 25.5, 26.7, 27.2, 27.5, 28.4, 28.7, 32.0, and 33.7. It was noted that this diffraction pattern appeared to contain better defined reflections and fewer separate phase metal oxides as compared to the classically prepared sample shown in FIG. 7A and described below.

The classical preparation used exactly the same procedure as described above except that the molybdate ammonia solution containing the solid silica sample was placed in a round bottom flask and stirred while the mixed metal salt solution was added dropwise. This material was calcined at 540° C. using a procedure identical to that above and resulted in a light brown material which exhibited an XRD shown in FIG. 7A.

A comparison of the diffraction patterns for the two materials showed that the process of the present invention produced a catalyst having a higher degree of phase purity than the classical method which is currently used in the preparation of the commercial acrylonitrile catalyst.

EXAMPLE 4—Electrolyte

This example serves to illustrate the capabilities of the invention process to produce solid state electrolytes which are used in the fabrication of fuel cells, oxygen gas sensors, and solid state electrolytes for electrochemical, and catalytic membrane applications. Four materials in the substitutional series $xY_2O_3$-$(1-x)ZrO_2$ were prepared by the process of the present invention to illustrate the capabilities of the method. The value of x was O, 0.03, 0.06, 0.09, and 0.12. A 9% sample (x=0.09) was prepared by classical co-precipitation techniques for comparison.

Figure 8:
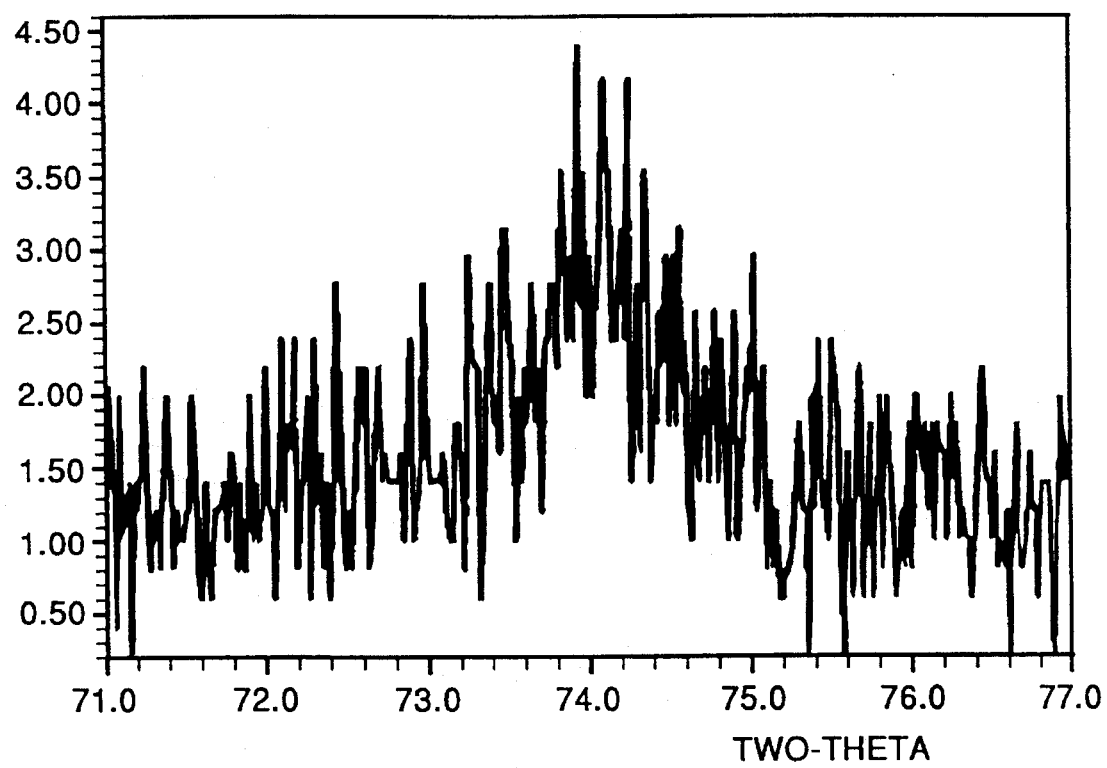
Figure 9:
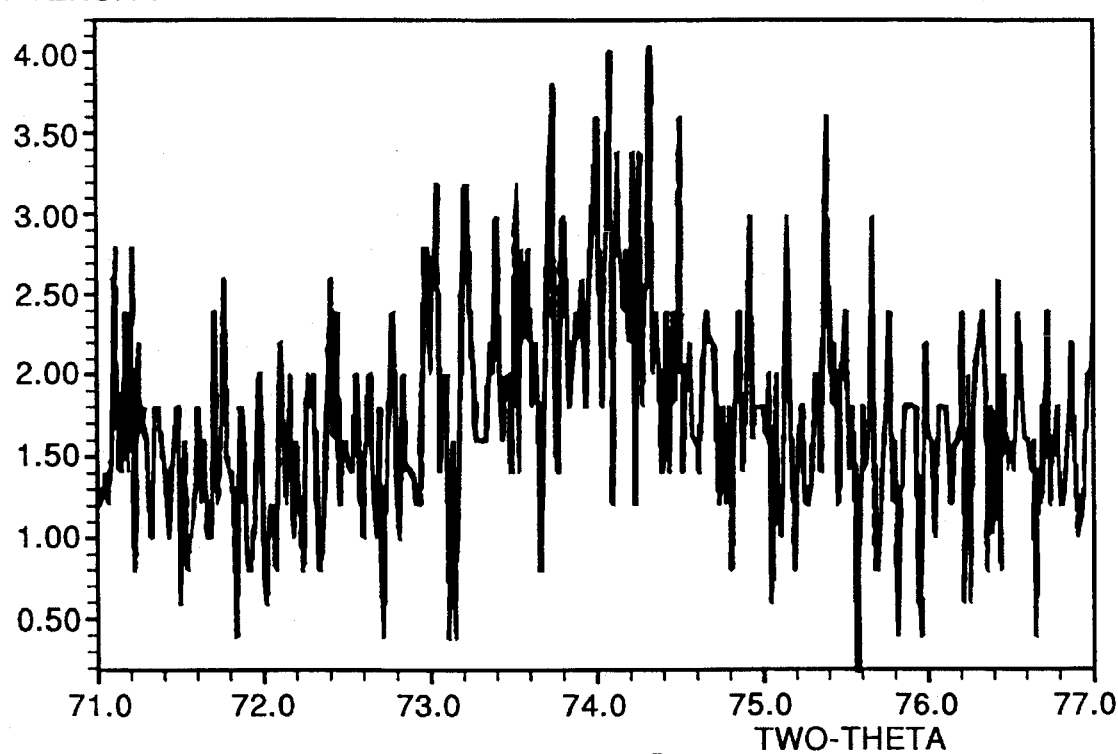
Figure 10:
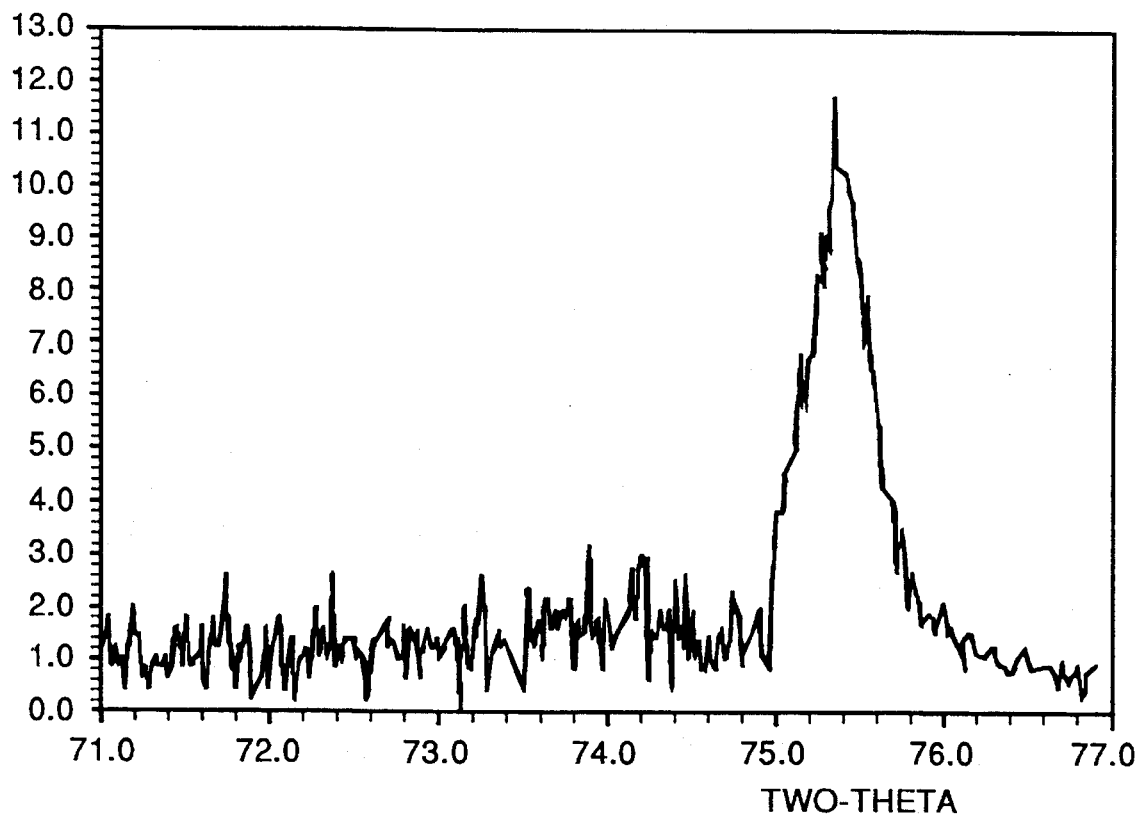

The invention process used the appropriate stoichiometries of yttrium nitrate-hydrate $(Y(NO_3)_3 \cdot 6H_2O)$ and zirconyl nitrate hydrate($ZrO(NO_3)z$) dissolved in the same aqueous solution. This solution was placed in the burette shown in FIG. 1 and added to an aqueous solution of ammonium hydroxide which was continuously recirculated through the cavitational device. The pH of the solution was monitored at 5 min intervals and was maintained at a pH of slightly above 9.0 to ensure that the solution was sufficiently basic to precipitate both metal salts. In the preparation of the desired materials, the following amounts of reagents were used (% Zr in $ZrO_2$, g zirconium compound, g yttrium compound): 3%, 11.45 g, 0.914 g; 6%, 10.74 g, 1.25 g; and 9%, 9.53 g, 1.57 g). All of the above salts were dissolved in 200 mL of distilled water. The recirculating solution contained 25 mL of concentrated ammonium hydroxide in 200 mL of distilled water. The precipitating mixture was recirculated continuously during the addition at a rate of 350 mL/min and was continued for 30 minutes after the addition was completed. The internal pressure in all of these experiments was 7,500 psig with the exception of a duplicate run of the 9% material which was carried out using an internal pressure of 17,000 psig. This higher pressure was used to examine the effect of a higher pressure during synthesis on the possibility for using cavitation to provide in situ flash calcination. The solid products were removed by filtration in an inert atmosphere box to ensure that no $CO_2$ reacted with them. The solids were washed with acetone, and dried at 80° C. for 10 hours. The XRD patterns for all of the materials prepared by the process of this invention demonstrated very low intensity and broad bands near 30 degree two theta indicating the formation of $TiO_2$ during the cavitational process. The assignment of crystal structure as either monoclinic, tetragonal or cubic was not possible due to the broadness and low intensity of the reflections. All of the compounds were calcined at only 500° C. for 24 hrs to induce crystallite growth. The XRD patterns for these materials all showed much sharper and stronger reflections at 30.5 degree two theta and very weak reflections near 74.2 and 75.5. The only sample providing a notable difference was the 9% material processed at 17,000 psi which demonstrated a moderately strong reflection at 75.4. This material showed no reflections at 74.75 indicating that it contained no cubic phase. The XRD of this material is best interpreted as being a texturized form of tetragonal zirconia, which is unusual. The classically prepared and invention prepared materials processed at 7,500 psig were mixtures of poorly crystallized samples of the normal tetragonal phase and cubic phases. The XRD patterns for the classically prepared material and, the material of the invention at 7,500 psig and the material processed at 17,500 psig, all in 9% yttria concentrations are shown in FIGS. 8, 9, and 10.

EXAMPLE 5—Piezo-electric

This example demonstrates that piezo-electric materials may be synthesized by the process of the present invention using much simplified methods of synthesis. The cavitational synthesis of this material represents a special problem due to the fact that all of the component metal salts needed to synthesize the piezoelectric are not soluble in a single common solvent. Thus, one cannot obtain a high phase purity materials, essential for adequate performance, by a single co-precipitation step. The synthesis of this material used a double feed configuration into a constantly recirculating solution of a precipitating agent. The piezo electric synthesized was lead zirconium titanate (PZT). In this synthesis, 4.2 g of titanium tetrabutoxide dissolved in hexane was placed in burette A. In burette B, was placed 5.7 g of zirconyl nitrate hydrate $(ZrO(NO_3)_2)$ and 9.36 g. of lead acetate dissolved in distilled water.

Figure 11:
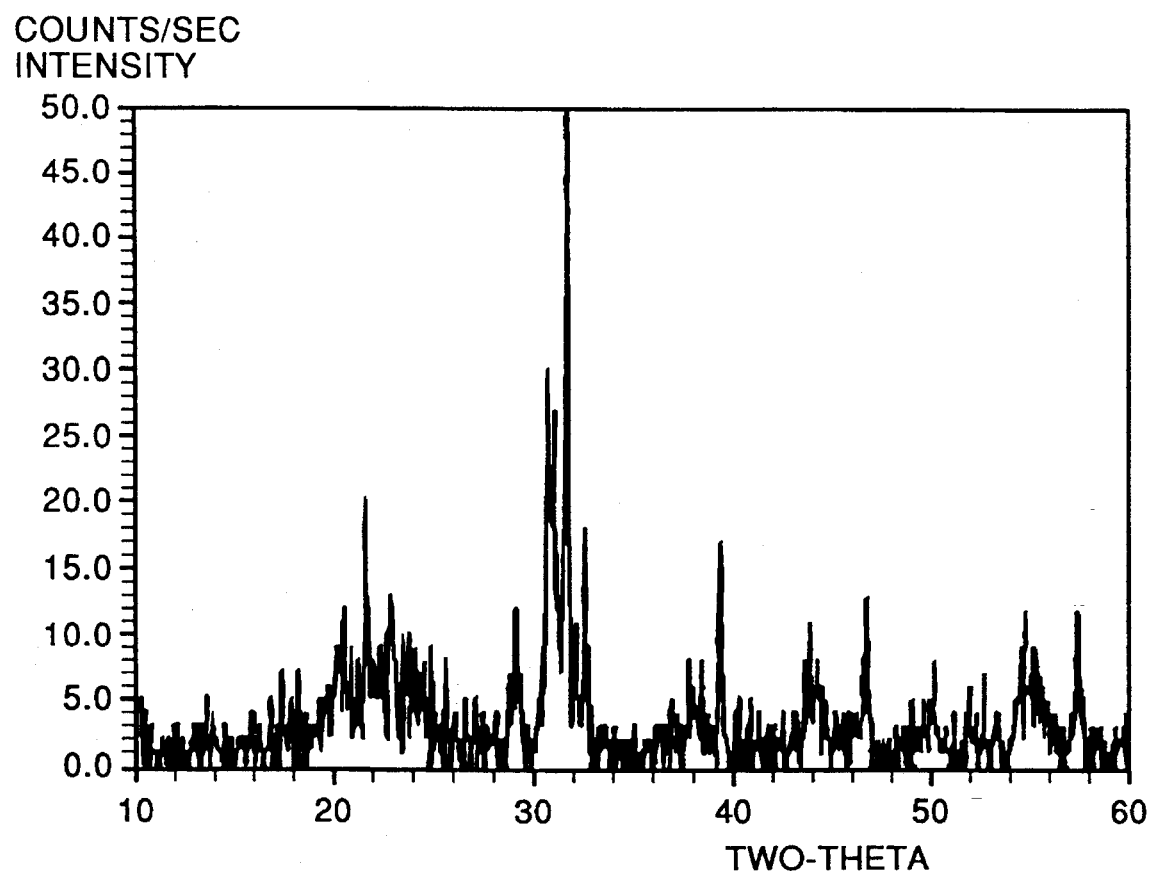
Figure 12:
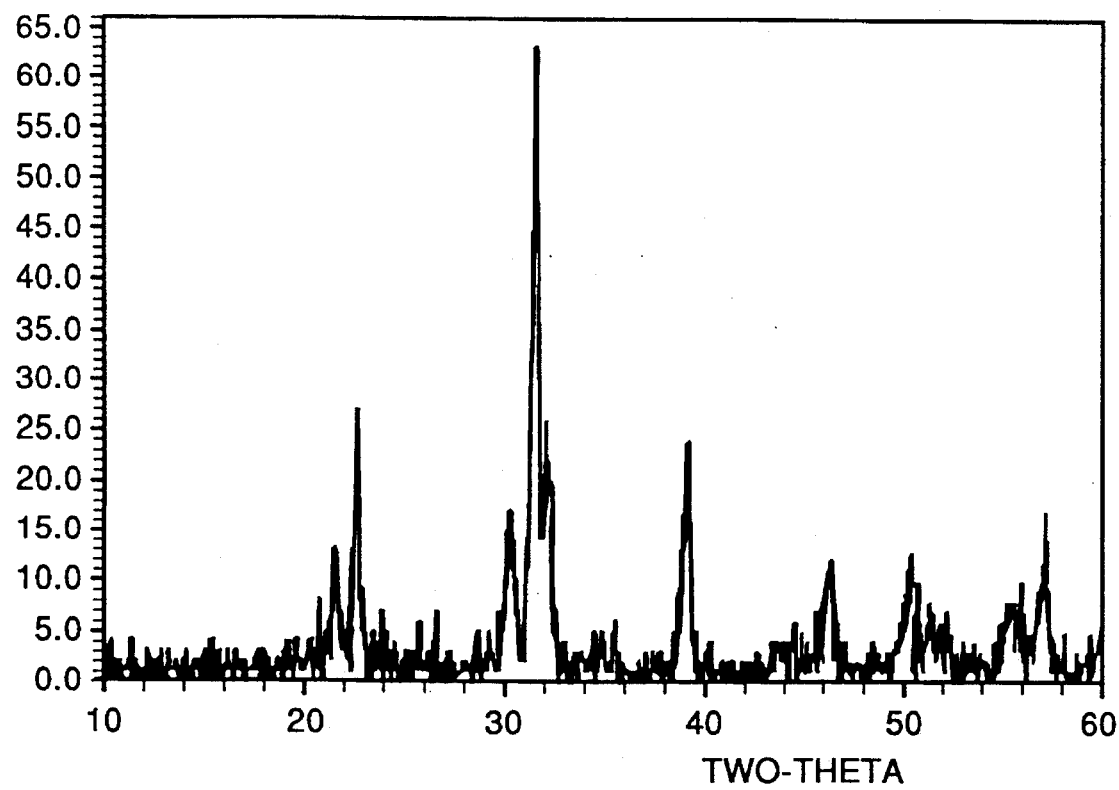

The rate of addition of both burettes was adjusted so as to deliver the stoichiometric amounts of each component required by the synthesis. Both feed solutions were injected into a continuously recirculated ammonium hydroxide solution to cause the precipitation. The feed line for the lead and titanium components was located at a position in the equipment built within the liquid intake of the pump used to generate the in- ternal pressure within the fluidizer apparatus. The pressure in this experiment was 17,000 psig, and the recirculation was continued for 45 min while the two solutions were added over 30 min. In contrast to this single stage synthesis, the classical method of preparation first precipitated the zirconium component from ammonium hydroxide followed by precipitating the titanium component in hexane into the zirconium oxide suspension, and finally this solid was filtered and redispersed in ammonium hydroxide followed by the precipitation of lead acetate onto the suspended solids. The material synthesized in this example was then filtered and dried for 12 hrs at 80° C. XRD analysis showed no discrete reflections. The materials were analyzed by XRD after calcination in air at 715° C. The classically prepared sample demonstrated reflections for the PZT piezoelectric as well as a large number of separate phase components. The material prepared by the invention process was mono-phasic tetragonal PZT. The differences in purities of the two preparations are illustrated in FIG. 11 for the classically prepared piezoelectric and FIG. 12 for the PZT prepared per this invention. The literature reported XRD for the PZT piezo electric is shown as a line drawing in FIG. 13.

EXAMPLE 6—Zeolite Catalysts

This example shows that in the synthesis of a bifunctional zeolite catalyst superior dispersions of metals may be obtained by performing critical portions of the synthesis experiments under the effect of cavitational processing which at the same time provides ultra-mixing.

This example demonstrates that the cavitational processing of gels formed during the hydrothermal synthesis of zeolite materials results in materials having superior homogeneity, larger crystallite sizes, and superior catalytic properties as contrasted to the classical synthesized materials. The first series of compounds resulted in the introduction of platinum into the internal crystal structure of H-ZSM-5 zeolites. In this synthesis the silica source, Ludox AS-40 (a low Al-containing colloidal Silica) was mixed with tetrapropyl ammonium hydroxide in water. This solution was placed in the burette and added over 30 min to a second recirculating solution of chloroplatinic acid in ammonium hydroxide-water which used enough additional base, NaOH, to ensure that the platinum component was soluble. During the addition, the zeolite gel formed immediately and was also recirculated. This precipitate and liquid suspension was continuously recirculated through the Microfluidizer for 30 additional minutes. The pressure used was 7,500 psig. Then the mixture was loaded into a high pressure autoclave where it was heated at 175° C. for 2–5 days. Samples were taken periodically under autogenous conditions, filtered and dried, and analyzed by XRD to determine when 100% crystallinity had been attained. At the end of the reaction the solids were removed by filtration and calcined in nitrogen at 575° C. for 24 hrs followed by calcination in air at 575° C. for 24 hrs. The degree of crystallinity was measured on the samples by XRD and compared to the identical preparation using no fluidizer treatment. The XRD of the materials prepared by the invention process showed a higher degree of crystallinity over the classically prepared materials when compared at the same reaction time. The XRD analysis demonstrated no bands for any platinum compounds indication that the platinum was well dispersed through out the catalyst. Inductively coupled arc plasma analysis showed that the zeolite contained the theoretical amount of platinum (1.95%) and that the Si/Al ratio was 3000. The scanning electron microgram of this material demonstrated that the particles were well formed coffin shaped crystals of about 10×2 microns. The material prepared by classical method was in the range of 2×2 microns and nearly cubic. Both classical and the zeolites prepared by the invention process demonstrated reflections typical of ZSM-5 at 3.1, 23.3, 23.7, 24.0, and 24.4 degree two theta.

Figure 16:
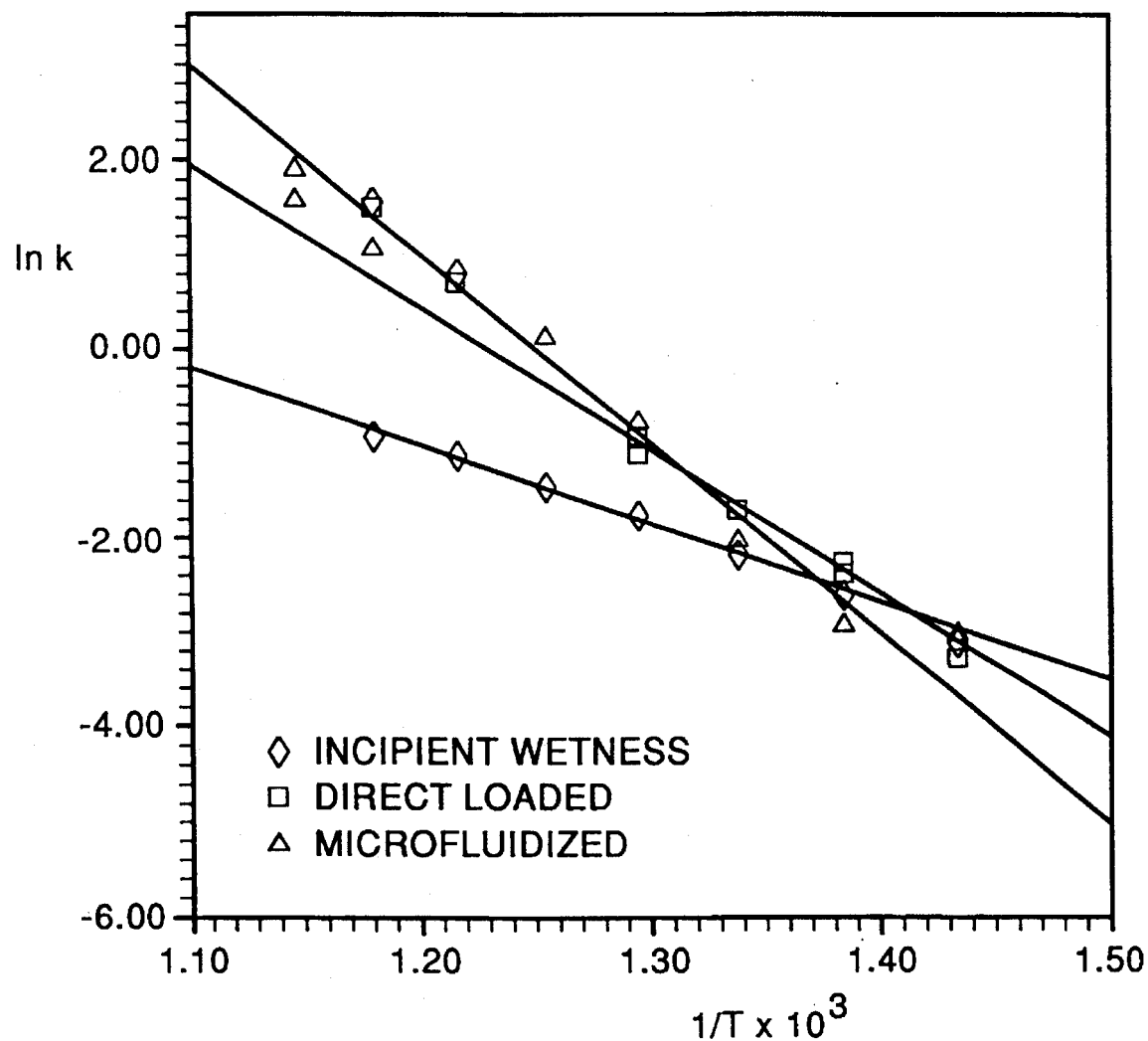

When this material was examined in a catalytic reaction for the reforming of n-hexane to benzene between 450° and 600° C. at atmospheric pressure using a co-feed of dilute hydrogen in nitrogen, this catalyst provided superior rates and selectivities to benzene as compared to five other platinum compositions in the same zeolite ZSM-5 framework prepared by the identical process except that the fluidizer was not used. FIG. 16 shows a comparison between the efficiency for hexane conversion (in hexane conversion rate, on the ordinate) and reciprocal of reaction temperature (1/T) using the most effective set of catalysts 2% Pt on H-Z5M-5. FIG. 16 shows that the Microfluidizer sample (triangles) led to higher hexane conversions compared to both a 2.9%. Pt-HZSM-5 (square symbols) and a classically prepared catalyst (Pt deposited on a previously synthesized H-ZSM-5 after synthesis (diamonds).

Using a similar but alternative method according to the present invention, a 2% palladium in ZSM-5 was synthesized. In this preparation the initial gel was continuously passed through the fluidizer at 7,500 psig for 30 min. The gel was prepared exactly as in Example 6 except that Pd(NO$_3$) was used instead of platinum. The entire mixture was transferred to a high pressure autoclave for the hydrothermal synthesis. The autoclave was heated at 175° C. for three days. After cooling the crystalline product was removed by filtration, dried, calcined in nitrogen to 575° C. for 24 hrs, and re- calcined in air at 575° C. for 24 hrs. The XRD of this material showed that it was ZSM-5, and no reflections for palladium were evident, demonstrating that the palladium was well dispersed. A classical method of preparation without fluidizer processing resulted in a final product with the same XRD pattern. However, the materials processed by the present invention were well formed crystallites of 10 microns while the classically prepared materials were 1 micron. When both of these materials were evaluated in a catalytic reactor for chemical performance in the conversion of synthesis gas (CO and H$_2$), at 375° C., 300 psi, and using a 10 sec. reacting gas contact time, the material produced by the process of the invention resulted in only exclusively olefins while the conversion was 75%. The classically prepared materials resulted in only a 11% conversion, lower olefin and mainly methane products. These catalytic results indicate that the active palladium catalyst was much better dispersed to provide the bifunctionality required for the conversion of syngas to lower olefins in high conversion.

A series of zinc modified H-ZSM-5 zeolites having low Si/Al ratios were synthesized by the process of the invention using two techniques. In the first, the zinc, silica sol (Ludox), aluminum hydroxide (Reheis), tetrapropyl ammonium hydroxide, and sodium hydroxide were added in water-ammonium hydroxide to a high pressure autoclave. Then the autoclave was heated while the contents of the autoclave were continuously recycled through a pump and fluidizer at a pressure of 7,500 psig. This was continued for four hours while the zeolite was undergoing a crystallization within the autoclave. At several later times, 10 and 24 hours, after the start time of the synthesis, the mixture was recirculated through the cavitational machine. The total synthesis time was 1–3 days. After the product was filtered and dried, it was calcined in air at 575° C. The XRD analysis of these materials demonstrated that they were well crystallized H-ZSM-5 with reflections at 2.1, 9.0, 23.1, 24.0, 30.0, 45.1 and 45.8 degree two theta and no separate phase for any zinc oxide could be detected.

The SEM analysis showed that the crystals were well formed into highly crystalline zeolites. The catalysts were examined for their capabilities to reform propane to aromatic hydrocarbons for unleaded automotive fuel applications. The activity and selectivity of this series of compounds having a range of zinc contents from 1 to 5% were superior to the same type of materials prepared by classical techniques.

EXAMPLE 7—Catalyst

The process of the present invention was used to synthesize a series of compounds known to be active for the commercial conversion of synthesis gas (CO and $H_2$) to methanol. This example illustrates that this type of catalyst can be synthesized by the process of the present invention where it is of exceptional importance to obtain a finished catalyst in which the copper component is in intimate contact with the zinc component, i.e. a well dispersed catalyst. The alumina component must be in intimate contact with both components since it acts to stabilize the catalyst from phase separation into copper oxide and zinc oxide during the catalytic process which are inactive. This example shows that the preparation of a series of copper modified zinc oxides with an alumina stabilizer resulted in catalysts having an exceptionally high phase purity when compared to classically prepared materials.

The synthesis of these solid state materials was accomplished using the process scheme shown in FIG. 2. The metal nitrates: copper nitrate hydrate, zinc nitrate hydrate, and aluminum nitrate hydrate, all being soluble in water were placed in the reservoir 24 shown in FIG. 2. This solution was added slowly over 40 min to a recirculating solution of ammonium bicarbonate in water. The internal pressure was 7,500 psig. The slurry which was formed was recycled through the equipment for an additional 30 min to insure the highest possible homogeneity. The particles so obtained were extremely fine and did not settle over four weeks. The XRD analysis of these materials taken after the usual air calcination at 350° C., demonstrated all of the peaks reported for the active methanol synthesis catalyst. The phase purity of these materials was superior to that obtained by a parallel classical, co-precipitation synthesis. The XRD of the copper, zinc, aluminum oxide catalyst prepared by the process of the present invention exhibits bands at 31.7, 34.5, and 36.3 typical of ZnO (WURTZITE form) and a small reflection at 35.5 for separate phase CuO having a height of 3.6% of the most intense zinc oxide peak at 3.6 degrees two-theta. Materials prepared by conventional co-precipitation methods demonstrate strong reflections for separate phase CuO, which are 5.9 times greater than the intensity of the reflection measured on the material prepared according to the present invention. The optimum condition for the classical synthesis vary from one compound to another. Throughout these studies literature procedures for the best co-precipitation procedure was used for each compound synthesized by the classical method. The catalyst classical synthesis described here used (Klier et al, *J. Catalysis*, 56, 407–429(1979). In general a precipitating agent, ammonium carbonate is added dropwise to a very well stirred solution of the nitrates of copper, zinc and aluminum until the pH rises to about 9.0. The solids are removed by filtration, washed until distilled water and dried ad air calcuid at 250° C. The purities were determined by comparison to the same compounds reported in *J. Catalysis*, supra, using XRD.

EXAMPLE 8—Catalyst

Figure 13:
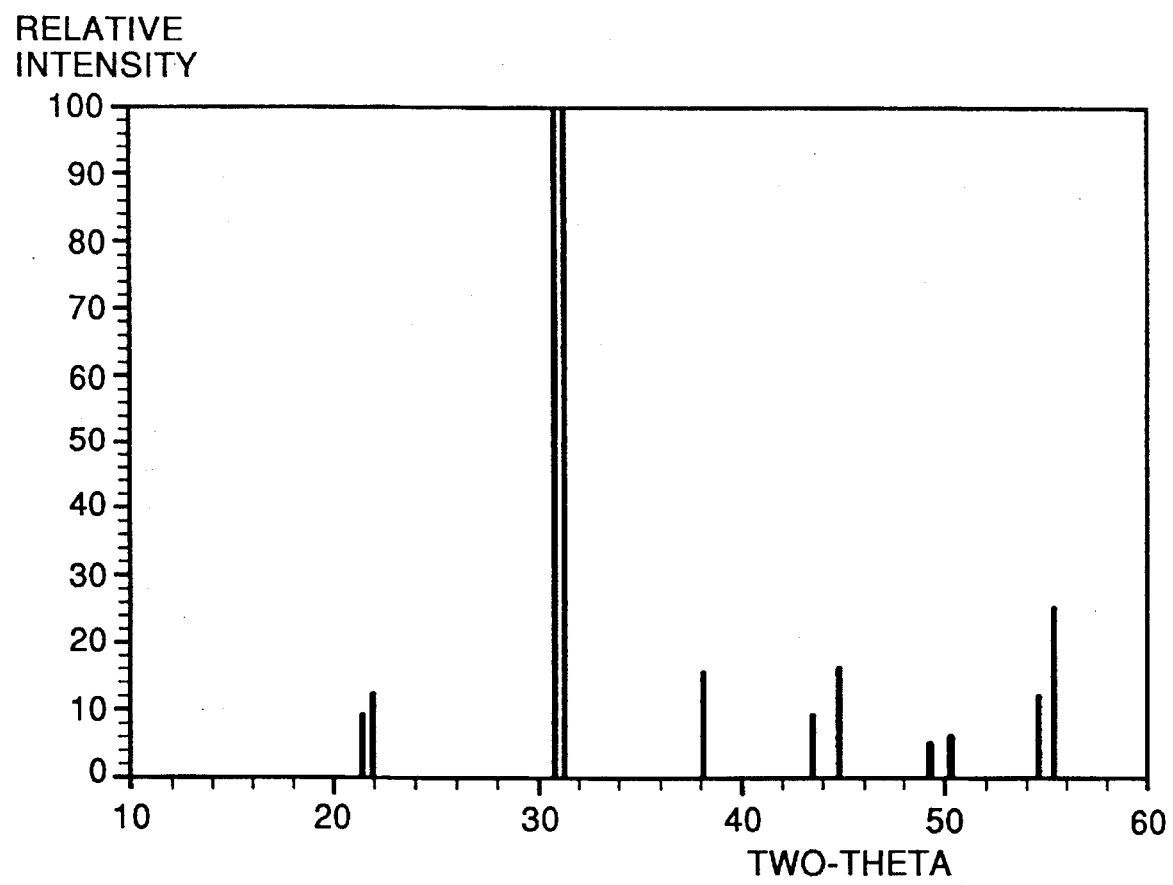
Figure 14:
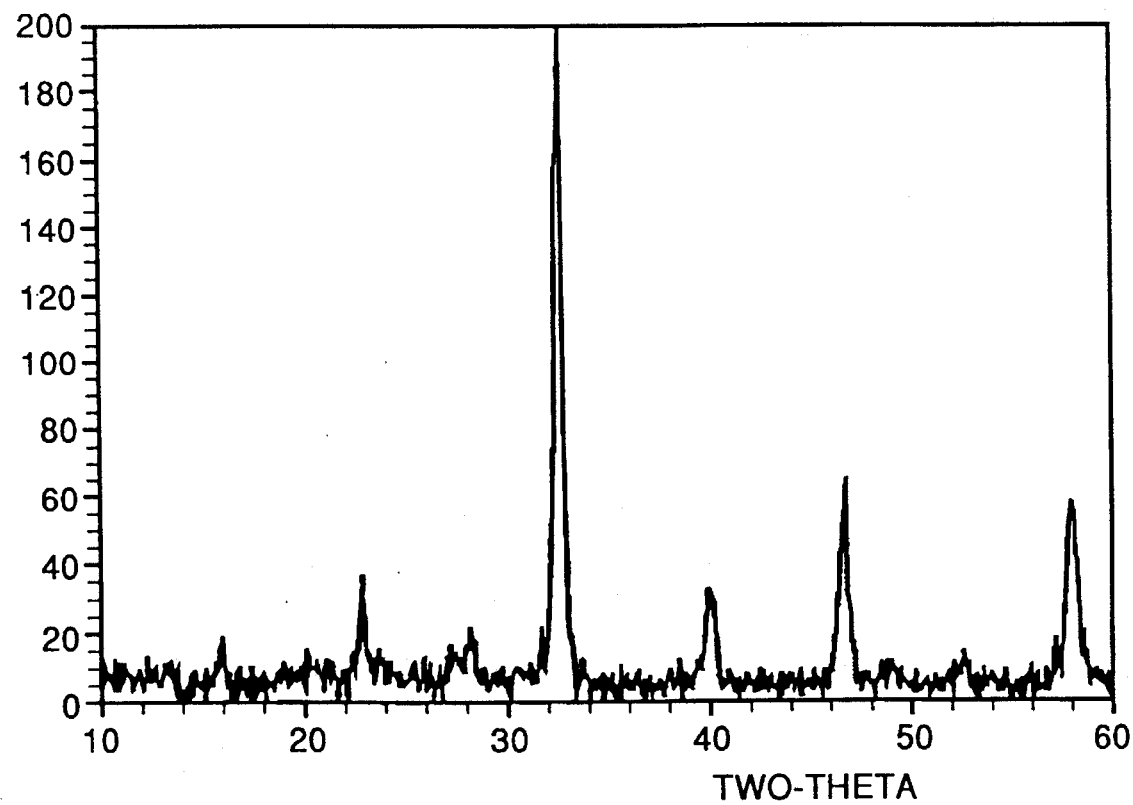
Figure 15:
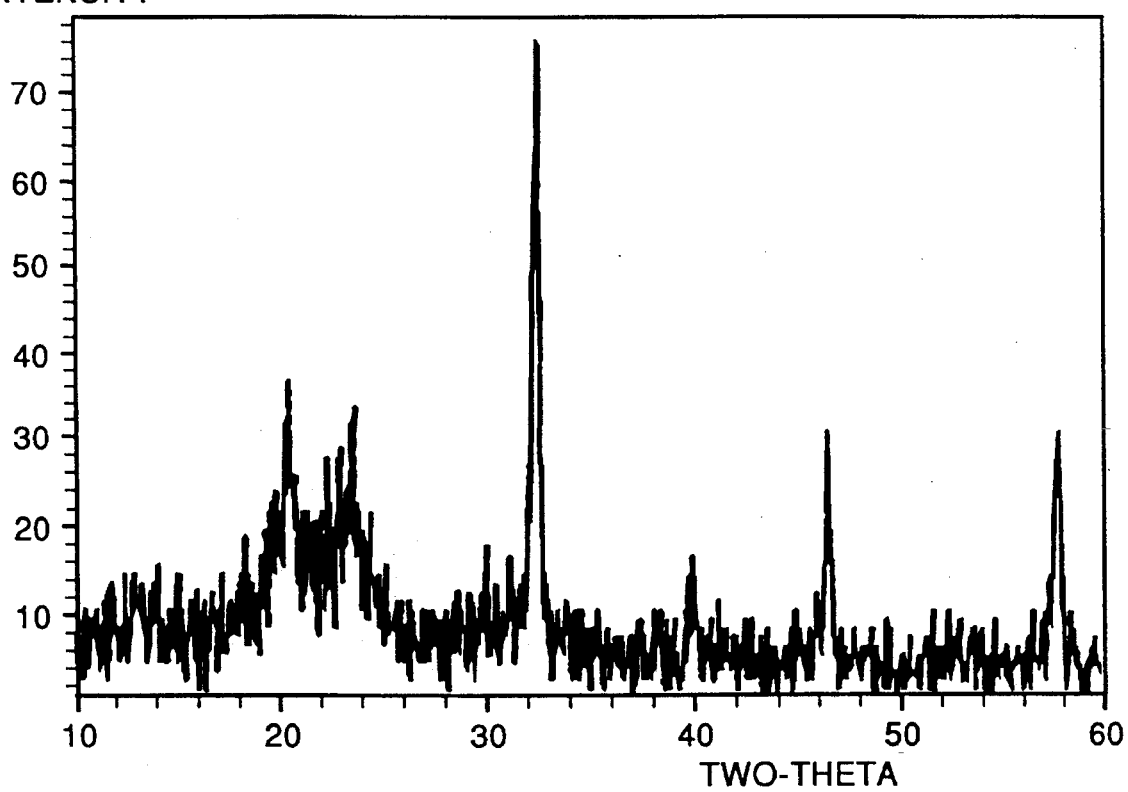

A series of solid state inorganic perovskites in the substitutional series $La_{(1-x)}Sr_xFeO_3$ was synthesized where x=0.0, 0.3, 0.6, 0.8, and 1.0. This type of compound has been reported in the literature to be an active catalyst for the complete oxidation of carbon monoxide to carbon dioxide for use in automotive exhaust applications as a substitute for the more expensive platinum based catalysts. In addition, this type of mixed metal oxide in the perovskite family is difficult to synthesize in high surface areas due to the high temperatures usually required for their synthesis if standard fusion preparation are used. These materials have also been prepared in high surface areas by co-precipitation, but separate phases are typically produced which result in reducing the catalytic efficiency of these catalysts. According to this invention, perovskites were synthesized using a solution of the metal nitrates of each metal in an aqueous solution placed in the burette of FIG. 1. A typical procedure according to the present invention used in the synthesis of the perovskite where x=0.80 follows. Lanthanum nitrate, 11.92, 1.46 g of strontium nitrate, and 13.9 g of iron nitrate were dissolved in 50 mL of distilled water. This solution was placed in a burette. Over a period of 30 min, the nitrate solution was added to a dilute ammonium hydroxide solution which was continuously recirculated through a fluidizer where the internal pressure was 7,500 psig. The recirculation continued for an additional 15 min after the addition is completed. During the processing, the pH of the recirculation solution was maintained with the addition of more ammonium hydroxide at a pH greater than 7.5. The solid product contained particles which were so small that they passed through Whatman No. 1 filter paper. Thus, the solvent was removed at 90° C. over a period of 36 hrs. The solids were dried at 100° C. under vacuum for 12 hrs. The powders were calcined at 600° C. in air to determine the minimum temperature for perovskite formation. The XRD of the prepared material and the classically prepared material demonstrated the typical JCPDS reflection pattern for the host perovskite, $LaFeO_3$. The classically prepared materials was made by co-precipitation and fusion using an aerosol technique. The co-precipitation is as described previously in Example 7. The fusion techniques used a well ground mixture of solid iron oxide and lanthanum carbonate. This mixture is calcined at 1300° C. for 2 days, cooled, reground, and the heating and grinding repeated 2 additional times. The XRD analysis was taken on those final solids. The XRD of all of the compounds synthesized in the series demonstrated diffraction patterns for the phase pure perovskite; however, a parallel preparation of the classically prepared material by co-precipitation demonstrated a material of substantially lower phase purity. The XRD patterns for the material of the present invention is shown in FIG. 13 and for the conventionally prepared material is shown in FIG. 14. Studies on other perovskites carried out at higher cavitational pressures of 18,000 psig indicate that some microcrystallinity is developed during the synthesis. The results suggest that this series of compounds prepared at even higher pressures would directly form the perovskite catalysts as nanophase materials which result in higher finished catalyst surface areas due to the fact that they do not require a high temperature air calcination to obtain the required perovskite structure.

EXAMPLE 9—Catalyst

This example illustrates the capabilities of the process of the present invention in fabricating industrial catalysts for the partial oxidation of hydrocarbons. Bismuth molybdates substituted with iron in different amounts has been found to provide high rates and selectivities for the partial oxidation of propylene to acrolein. LaLacono et al, "The Catalytic Oxidation of Propylene. V. X-Ray Characterization of Iron Containing Bi-Mo Catalysts", Journal of Catalysis, 40, 19–33 (1975).

The process of the present invention was used to prepare catalysts in this substitutional series, $Bi_{(2-2x)}Fe_{2x}Mo_3 O_{12}$ where the degree of iron substitution, x, was varied from 0.01, 0.02, 0.02, 0.05, and 0.17. The entire series of compounds were synthesized by dissolving the individual metal nitrates of Bi and Fe in the calculated proportions to obtain the above stoichiometries in 10 %v/v of nitric acid in water. This solution was placed in the reservoir and added to a recirculating solution of the ammonium paramolybdate in water. This solution was recirculated continuously for 30 min using an internal cavitational pressure of 7,500. The solids could not be removed by filtration since they were so fine. They were recovered by evaporation the slurries to near dryness. The compounds were calcined in air at 400° C. The XRD patterns were measured on the entire series and compared to the equivalent compounds by co-precipitation. This comparison showed that the processed materials formed the desired catalysts and they were generally formed in a higher state of phase purity as compared to the classical, co-precipitated compounds. The procedure was a co-precipitation method which was carried out by the procedure for preparation of this class of materials describing by Keulks, Hall, Daniels and Suzuki, 79 (1974) In both cases, the iron concentration was relatively low; thus, the alpha bismuth molybdate phase, $Bi_2Mo_3O_{12}$ was the major component observed. The materials of the present invention as compared to prior art materials prepared by conventional methods exhibit slightly higher crystallinity evidenced by slightly broadened (about 30%) XRD reflections. Their original solutions were so fine that they could not be filtered.

EXAMPLE 10—Superconductor

Superconducting metal oxides were prepared using the equipment configuration shown in FIG. 2. The 1-2-3 superconductor $Y_{1.0}Ba_{2.0}Cu_{3.0}O_{(7-x)}$ was prepared by introducing a solution of the nitrates of barium, yttrium and copper into reservoir 22 in Fig 2. This solution was slowly added to a recirculating solution of potassium hydroxide loaded into port B in FIG. 2. The equipment was operated at an internal pressure of 18,000 psig. After the addition was completed, the slurry was allowed to recirculate for an additional 15 min. The solids were removed by filtration and dried. The material was formed into a pellet and calcined in air under a programmed temperature heat-up and cool down. The XRD of the material produced by the invention process demonstrated a phase pure sample of the known Y-Ba-Cu superconductor. The material formed into a pellet was mounted into equipment to test its low temperature electrical conductivity and its Meissner effect. This evaluation demonstrated that the materials became superconducting at 90° K and the band width between semiconducting and superconduction was narrowed to 1 K. The narrow band width is evidence for a very high phase purity superconducting material. A similar preparation of the 1-2-3 superconducting phase was carried out by cavitational processing in which 30% w/w silver was introduced into the precipitating mixture. This material was processed in the same way as the standard 1-2-3 preparation. The XRD demonstrated that it was the superconducting phase after the programmed thermal calcination in air. The low temperature electrical resistance measurements showed that the materials was superconducting at 90° K. It showed a very low electrical resistance before the inflection point where it became superconducting. This material also demonstrated a very narrow, 1K, transition between semiconducting and superconducting.

Parallel experiments to prepare the superconducting 1-2-3 superconductor by conventional co-precipitation techniques. *Inorg. Chem.* 26, 1474 (1987) and *Inorg. Chem.* 26, 1834 (1987) using the identical amounts of reagents and well stirred co-precipitation techniques produced a very low purity superconductor as judged by XRD. This material was superconducting when its resistance was measured at 90° K after the programmed calcination in air. In this case, the transition between semiconducting and superconducting was much broader (2°–4° K). The data indicate that superconductors of the present invention are higher purity materials than prior art materials which display impurities between 29–31 degrees two theta. Such impurities were not detected with the material of this Example. The method also demonstrated that silver is easily dispersed through out the superconductor leading to a more favorable application in the fabrication of superconduction wire and likely a high critical current density.

What is claimed is:

1. A process for producing solid state materials having a phase purity greater than about 99% and less than 1% in discrete separate phase compounds comprising (1) mixing together a metal containing solution and a second solution containing a precipitating agent to form a mixed solution, (2) pressurizing the mixed solution to a pressure in the range from about 1,000 to about 50,000 psig, (3) passing the mixed solution into a fluidizing apparatus wherein high shear forces act on the mixed solution, (4) depressurizing the mixed solution so as to cause cavitation, and (5) separating a solid state material from the cavitated mixed solution.

2. The process of claim 2, wherein the pressure is of from about 12,000 to 25,000 psig.

3. The process of claim 1, wherein the metal containing solution and the precipitating agent containing solution are mixed prior to passage into the fluidizing apparatus.

4. The process of claim 1, wherein an additional solution material containing a solid support is added along with the metal containing solution and the precipitating agent containing solution to form the mixed solution.

5. The process of claim 1, wherein the mixed solution is recycled through the fluidizer apparatus.

6. The process of claim 1, wherein the precipitating agent solution is gradually added to the mixed solution as it is recycled.

7. The process of claim 1, wherein the metal containing solution is gradually added to the mixed solution as it is recycled.

8. The process of claim 1, wherein the metal containing solution and the precipitating agent solution are mixed together as they enter the pressurizing pump.

9. The process of claim 1, wherein the metal containing solution is a metal salt solution.

10. The process of claim 1, wherein the salt is selected from any of a nitrate, an acetate, chloride, sulfate or bromide.

11. The process of claim 1, wherein the solid state material is a metal catalyst.

12. The process of claim 12, wherein the metal catalyst comprises a mixture of metals.

13. The process of claim 1, wherein the metal containing solution and the precipitating agent solution are mixed together in a separate vessel.

14. The process of claim 13, wherein the metal containing solution contains a source of silica and the so formed mixed solution is a zeolite gel.

15. The process of claim 14, wherein the zeolite gel is formed in an autoclave.

16. The process of claim 15, wherein the autoclave is pressurized.

17. The process of claim 15, wherein the zeolite gel is recycled between the autoclave and the fluidizer apparatus.

18. The process of claim 1, wherein the precipitating agent solution contains a source of silica and the mixed solution forms as a zeolite gel as the two solutions are mixed together.

19. The process of claim 18, wherein the precipitating agent containing solution is gradually added to the mixed solution which is being recycled through the fluidizer apparatus.

20. A process for producing a metal-containing crystalline product comprising: (1) subjecting a metal-containing solution to high pressure at a pressure in the range from about 1,000 to about 50,000 psig and high shear force in the presence of a precipitating agent, (2) depressurizing the resulting solution; and (3) transferring the depressurized solution to a crystallization vessel to affect hydrothermal synthesis of a metal-containing crystalline product.

21. A process of claim 20, wherein (1) mixing a metal-containing solution is with a precipitating agent; (2) pressurizing the mixed solution; (3) passing the mixed solution into a fluidizing apparatus, wherein high shear forces act on the mixed solution; (4) depressurizing the mixed solution; (5) transferring the depressurized solution into a high pressure autoclave under hydrothermal synthesis conditions, whereby at least a portion of the metal-containing solution is converted into a metal-containing crystalline product; and (6) cooling the mixture and separating the metal containing crystalline product from the remaining solution by liquid-solid preparation.

22. The process of claim 21, wherein the metal-containing solution is a zeolite gel and the hydrothermal synthesis is carried out at a temperature from about 60° C. to about 170° C. under a pressure ranging from about 14 psia to about 800 psia from about 4 hours to about 170 hours.

* * * * *

UNITED STATES PATENT AND TRADEMARK OFFICE
CERTIFICATE OF CORRECTION

PATENT NO. : 5,466,646
DATED : November 14, 1995
INVENTOR(S) : Moser

It is certified that error appears in the above-indentified patent and that said Letters Patent is hereby corrected as shown below:

Col. 18, line 38:    Delete "claim 2" and insert -- claim 1--

Col. 18, line 65:    Delete "claim 12" and insert -- claim 1--

Signed and Sealed this

Twentieth Day of February, 1996

Attest:

BRUCE LEHMAN

Attesting Officer     Commissioner of Patents and Trademarks